(12) United States Patent
Geng et al.

(10) Patent No.: US 11,941,259 B2
(45) Date of Patent: Mar. 26, 2024

(54) COMMUNICATION METHOD, APPARATUS, COMPUTER-READABLE STORAGE MEDIUM, AND CHIP

(71) Applicant: Huawei Technologies Co., Ltd., Shenzhen (CN)

(72) Inventors: Dongjiu Geng, Shanghai (CN); Chuanlong Yang, Hangzhou (CN); Yan Sang, Beijing (CN); Qiangmin Lin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 124 days.

(21) Appl. No.: 17/369,520

(22) Filed: Jul. 7, 2021

(65) Prior Publication Data
US 2021/0334018 A1 Oct. 28, 2021

Related U.S. Application Data

(63) Continuation of application No. PCT/CN2020/105344, filed on Jul. 29, 2020.

(30) Foreign Application Priority Data

Sep. 18, 2019 (CN) .......................... 201910883765.7

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)

(58) Field of Classification Search
CPC .... G06F 3/0622; G06F 3/0655; G06F 3/0679; G06F 9/4818; G06F 2212/173; G06F 12/1441; G06F 2212/1032; G06F 2212/1052; G06F 12/1491; G06F 21/62; G06F 21/78; G06F 21/74; G06F 21/44; G06F 2221/2105; G06F 2221/2113
See application file for complete search history.

(56) References Cited

U.S. PATENT DOCUMENTS

| | | | |
|---|---|---|---|
| 11,036,887 B2 * | 6/2021 | Troia | ................... G06F 12/1441 |
| 2014/0282819 A1 | 9/2014 | Sastry et al. | |

(Continued)

FOREIGN PATENT DOCUMENTS

| | | | |
|---|---|---|---|
| CN | 103810422 A | 5/2014 | |
| CN | 104573565 A | 4/2015 | |

(Continued)

*Primary Examiner* — Zhuo H Li
(74) *Attorney, Agent, or Firm* — Gregg Jansen

(57) ABSTRACT

A communication method applied to a computer system that includes a first subsystem and a second subsystem. A safety level of the first subsystem is higher than a safety level of the second subsystem. The first subsystem includes a memory access checker. The method includes the memory access checker receives a memory access request from a memory access initiator, determines, based on preconfigured memory safety level division information, whether a safety level of a memory to be accessed by the memory access initiator matches a safety level of the memory access initiator, and allows the memory access initiator to access the memory address when the safety level of the memory matches the safety level of the memory access initiator.

18 Claims, 12 Drawing Sheets

(56) References Cited

U.S. PATENT DOCUMENTS

2015/0212952 A1* 7/2015 Wegner ................ G06F 8/656
    711/152
2017/0322891 A1* 11/2017 Feng ................ G06F 21/6218
2019/0065785 A1* 2/2019 Barr ..................... G06F 21/00

FOREIGN PATENT DOCUMENTS

| CN | 104981815 A | 10/2015 |
| CN | 110210214 A | 9/2019 |
| EP | 2648129 A1 | 10/2013 |

\* cited by examiner

COMMUNICATION METHOD, APPARATUS, COMPUTER-READABLE STORAGE MEDIUM, AND CHIP

CROSS-REFERENCE TO RELATED APPLICATIONS

This application is a continuation of International Patent Application No. PCT/CN2020/105344 filed on Jul. 29, 2020, which claims priority to Chinese Patent Application No. 201910883765.7 filed on Sep. 18, 2019. The disclosures of the aforementioned applications are hereby incorporated by reference in their entireties.

TECHNICAL FIELD

This application relates to the field of autonomous driving technologies, and in particular, to a communication method, an apparatus, a computer-readable storage medium, and a chip.

BACKGROUND

With the increasing complexity of computer systems, how to ensure the normal operation of various subsystems in the computer system and prevent some abnormal subsystems from interfering with other normal subsystems is a relatively important issue.

The field of autonomous driving is used as an example. To assess safety risks of automobiles, hazard analysis and risk assessment for the autonomous driving system are usually carried out at the design stage of automobile products to identify the hazards of different systems. If the safety risks of the systems are greater, the corresponding safety requirement levels are higher. To assess the safety levels of automobiles, the International Organization for Standardization (ISO) 26262 "Road Vehicles—Functional Safety" introduced the concept of Automotive Safety Integrity Level (ASIL) and defined four different ASILs ASIL A, ASIL B, ASIL C, and ASIL D. ASIL D is the highest safety integrity, and ASIL A is the lowest safety integrity. In addition, if a risk is identified as quality management (QM), there is no corresponding safety requirement.

In the field of autonomous driving, these systems with safety levels need to reliably ensure personal safety. Even if a failure or accident occurs in one ASIL domain system partition, the normal operation of another ASIL domain system cannot be affected. This requires strict isolation between different ASIL safety level domains. If the isolation is not thorough, a severe consequence may be caused. In addition, it is necessary to ensure that the communication between different functional safety partitions has low latency and high reliability.

One solution is to deploy safety domain systems of different safety levels on different hardware devices by stacking a large quantity of electronic control units (ECUs) to achieve the purpose of resource isolation. Different safety domain systems communicate with each other through the Controller Area Network (CAN)/universal asynchronous receiver-transmitter (UART) low-speed bus. In this solution, it is equivalent that different safety domain systems are individually executed by different devices. Although resource isolation is achieved, a large amount of hardware stacking is required, and the communication between different safety domain systems has relatively high latency.

Another solution is to use the virtualization technology to virtualize physical devices, and then deploy safety domain systems of different safety levels on different virtual devices. The hardware of the entire system is uniformly managed by using a virtual machine monitor (VMM) (or a hypervisor). Hardware devices are shared or exclusively used by a specific virtual machine (VM) in a shared or bypass manner. In this solution, although systems in different safety domains are assigned different virtual machines, these virtual machines share some underlying hardware. Therefore, this solution does not achieve complete resource isolation, and consequently the reliability of the system is affected to some extent.

SUMMARY

This application provides a communication method, a computer system, an apparatus, a computer-readable storage medium, and a chip, so as to achieve isolation between systems with different safety levels in the computer system.

According to a first aspect, a communication method is provided, where the method is applied to a computer system, the computer system includes a first subsystem and a second subsystem, a safety level of the first subsystem is higher than a safety level of the second subsystem, a central processing unit (CPU) core of the first subsystem, a CPU core of the second subsystem, and a memory access checker are integrated on a same chip. The computer system includes an interrupt controller, and the interrupt controller is shared by the first subsystem and the second subsystem. Interrupt routing configuration information stored in the interrupt controller is configured by the CPU core of the first subsystem, and the interrupt routing configuration information is used to indicate a CPU core that responds to each interrupt. The first subsystem further includes a memory access checker. The communication method further includes that the memory access checker receives a memory access request from a memory access initiator, the memory access checker determines, based on preconfigured memory safety level division information, whether a safety level of a memory to be accessed by the memory access initiator matches a safety level of the memory access initiator, and when a safety level of a memory to be accessed by the memory access initiator matches a safety level of the memory access initiator, the memory access checker allows the memory access initiator to access the memory.

The memory access request carries a memory address to be accessed by the memory access initiator and safety level information of the memory access initiator, and the memory safety level division information is used to indicate safety levels of memories in different address segments of the computer system.

Optionally, the foregoing computer system is a system in an unmanned driving system.

When the foregoing computer system is a system in an unmanned driving system, driving of the unmanned driving system can be controlled by the computer system.

It should be understood that in this application, a higher safety level indicates a higher safety degree.

Optionally, the foregoing method further includes when the safety level of the memory to be accessed by the memory access initiator does not match the safety level of the memory access initiator, disallowing the memory access initiator to access the memory.

In this application, the memory access checker is configured in a subsystem with a high safety level, and the memory of the computer system is divided based on a safety level, so as to achieve good isolation between different subsystems of the computer system, thereby preventing an exception of a subsystem from affecting normal operation of another subsystem as far as possible.

It should be understood that in this application, the computer system may further include another subsystem in addition to the first subsystem and the second subsystem, and a quantity of subsystems included in the computer system is not limited in this application. When the computer system includes another subsystem, a safety level can be configured for the other subsystem in a similar manner as that for the first subsystem or the second subsystem.

In this application, the second subsystem may be subdivided into at least two microsystems, and then the at least two microsystems are configured in the manner of configuring the first subsystem and the second subsystem.

For example, the second subsystem may be subdivided into a first microsystem and a second microsystem, and safety levels of the first microsystem and the second microsystem are configured in the foregoing manner of configuring the first subsystem and the second subsystem, so that the safety level of the first microsystem is higher than the safety level of the second micro system.

With reference to the first aspect, in some implementations of the first aspect, the foregoing method further includes an input/output (IO) device receives an access request from an access device, where the access request carries safety level information of the access device, when a safety level of the access device matches a safety level of the IO device, the IO device allows the access device to access the IO device.

The IO device is any IO device in the first subsystem or the second subsystem.

In this application, the IO device accepts the access of the access device only when the safety level of the access device matches the safety level of the IO device, if the safety level of the access device does not match the IO device, the IO device does not accept the access of the access device, so as to achieve a certain degree of isolation between the access device and the IO device, and prevent an access device whose safety level does not match the IO device from accessing the IO device.

With reference to the first aspect, in some implementations of the first aspect, that the safety level of the access device matches the safety level of the IO device includes that the safety level of the access device is higher than or equal to the safety level of the IO device.

In this application, the access device is allowed to access the IO device only when the safety level of the access device is higher than or equal to the safety level of the IO device, in other words, a device with a high safety level can access a device with the same safety level or a lower safety level, so that a device with a lower safety level cannot access a device with a higher safety level, thereby achieving a certain degree of isolation between the access device and the IO device.

Further, because a device with a low safety level cannot access a device with a high safety level, this can prevent an exception of the device with a low safety level from affecting the device with a high safety level.

With reference to the first aspect, in some implementations of the first aspect, the foregoing method further includes that an interrupt controller receives an interrupt request from an interrupt initiator, where the interrupt request carries safety level information of the interrupt initiator, the interrupt controller determines whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allows the interrupt receiver to accept the interrupt request.

In this application, the interrupt controller can be configured to process the interrupt request, so that when the safety level of the interrupt initiator matches the safety level of the interrupt receiver, the interrupt receiver accepts the interrupt request, thereby achieving isolation between the interrupt initiator and the interrupt receiver when the interrupt request is processed normally.

With reference to the first aspect, in some implementations of the first aspect, that the safety level of the interrupt initiator matches the safety level of the interrupt receiver includes both the interrupt initiator and the interrupt receiver belong to the first subsystem, both the interrupt initiator and the interrupt receiver belong to the second subsystem, or the interrupt initiator belongs to the first subsystem and the interrupt receiver belongs to the second sub system.

When the safety level of the interrupt initiator is higher than or equal to the safety level of the interrupt receiver, the interrupt receiver is allowed to receive the interrupt request initiated by the interrupt initiator, so as to prevent a device with a high safety level from receiving or processing an interrupt request initiated by a device with a low safety level. This prevents an exception of the device with a low safety level from affecting the device with a high safety level as far as possible.

With reference to the first aspect, in some implementations of the first aspect, that the safety level of the interrupt initiator does not match the safety level of the interrupt receiver includes that the interrupt initiator belongs to the second subsystem and the interrupt receiver belongs to the first subsystem.

When the safety level of the interrupt initiator is lower than the safety level of the interrupt receiver, the interrupt receiver does not accept the interrupt request of the interrupt initiator. In this way, when a device in a low-safety system is faulty, interference caused to a device in a high-safety system can be avoided as far as possible.

With reference to the first aspect, in some implementations of the first aspect, that the safety level of the memory to be accessed by the memory access initiator matches the safety level of the memory access initiator includes that the safety level of the memory access initiator is higher than or equal to the safety level of the memory to be accessed by the memory access initiator.

Because the memory access initiator can access only a memory with the same safety level or a lower safety level, it is possible to prevent a device in a low-safety system from accessing a memory with a higher safety level as far as possible, thereby achieving isolation of the memory to some extent.

With reference to the first aspect, in some implementations of the first aspect, when the safety level of the memory access initiator is lower than the safety level of the memory to be accessed by the memory access initiator, it is determined that the safety level of the memory to be accessed by the memory access initiator does not match the safety level of the memory access initiator.

With reference to the first aspect, in some implementations of the first aspect, the first subsystem includes a partition manager, and the method further includes that the partition manager configures safety levels for devices in the first subsystem and the second subsystem based on a safety level configuration file of the computer system.

The safety level configuration file of the computer system is used to indicate the safety levels of the devices in the first subsystem and the second subsystem, and safety levels of memories used by the first subsystem and the second subsystem.

The partition manager can be configured to configure safety levels of the first subsystem and the second subsystem, so as to achieve isolation between the first subsystem and the second subsystem.

It should be understood that before configuring the safety levels of the first subsystem and the second subsystem, the partition manager may first obtain and parse the safety level configuration file of the computer system, then, after obtaining the safety levels of the devices in the first subsystem and the second subsystem, and the safety levels of the memories used by the first subsystem and the second subsystem, the partition manager configures the safety levels of the first subsystem and the second subsystem.

Optionally, the foregoing safety level configuration file is a preconfigured file.

Further, the foregoing safety level configuration file may be determined in advance based on a device status and an application requirement of the computer system. After the safety level configuration file is determined, the safety level configuration file may be written into a cache of the computer system, so that the partition manager easily obtains and parses the safety level configuration file subsequently.

Optionally, the foregoing safety level configuration file is obtained from the cloud.

Further, the foregoing safety level configuration file may be downloaded from the cloud by the computer system.

In addition, the foregoing safety level configuration file can be periodically or aperiodically updated or upgraded.

With reference to the first aspect, in some implementations of the first aspect, that the partition manager configures the safety levels for the devices in the first subsystem and the second subsystem based on the safety level configuration file includes that the partition manager writes safety level information of a CPU core into a safety level configuration module corresponding to the CPU core.

The safety level information of the CPU core is used to indicate a safety level of the CPU core. The safety level configuration module corresponding to the CPU core may be located inside or outside the CPU.

The safety level configuration module corresponding to the CPU core may be a hardware module, and may be implemented by a hardware circuit. The safety level configuration module is configured to process a signal output by the CPU core so that the processed signal includes the safety level information of the CPU core.

That the foregoing partition manager writes the safety level information of the CPU core into the safety level configuration module corresponding to the CPU core may be writing the safety level information of the CPU core into a register corresponding to the safety level module corresponding to the CPU core. After the writing is completed, the safety level module corresponding to the CPU core can obtain the safety level information of the CPU core from the register.

With reference to the first aspect, in some implementations of the first aspect, in the foregoing computer system, the CPU core is in a one-to-one correspondence with the safety level configuration module, and each safety level configuration module is configured to indicate a safety level of the corresponding CPU core.

In other words, each CPU core may correspond to one safety level configuration module, and each safety level configuration module is configured to indicate a safety level of the corresponding CPU core. When each CPU core corresponds to one safety level configuration module, a corresponding safety level can be relatively flexibly configured for each CPU core.

With reference to the first aspect, in some implementations of the first aspect, the safety level configuration module corresponding to the CPU core is configured inside the CPU core.

When the safety level configuration module corresponding to the CPU core is configured inside the CPU core, the safety level configuration module can easily process a signal output by the CPU core, so that the processed signal includes the safety level information of the CPU core.

With reference to the first aspect, in some implementations of the first aspect, in the foregoing computer system, a CPU cluster is in a one-to-one correspondence with the safety level configuration module, the CPU cluster includes a plurality of CPU cores, and the safety level configuration module is configured to indicate safety levels of the plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

With reference to the first aspect, in some implementations of the first aspect, the safety level configuration module corresponding to the CPU cluster is configured in a protocol processing module L3_TAG of a layer 3 (L3) cache corresponding to the CPU cluster.

With reference to the first aspect, in some implementations of the first aspect, that the partition manager configures the safety levels for the devices in the first subsystem and the second subsystem based on the safety level configuration file includes that the partition manager writes the memory safety level division information into the memory access checker.

The partition manager writes the memory safety level division information into the memory access checker, so that the memory access checker can check and manage memory access based on the written memory safety level division information, facilitating subsequent memory isolation.

With reference to the first aspect, in some implementations of the first aspect, that the partition manager configures the safety levels for the devices in the first subsystem and the second subsystem based on the safety level configuration file includes that the partition manager writes safety level information of an IO device into a safety level configuration and detection module corresponding to the IO device. The safety level configuration and detection module corresponding to the IO device is configured to detect the access request received by the IO device, to determine whether a safety level of a device that initiates the access request matches a safety level of the IO device.

The partition manager writes the safety level information of the IO device into the IO device, so that the safety level of the IO device can be configured, and a safety level configuration and detection module of the configured IO device can check the safety level of the device that initiates the access request, thereby achieving isolation between devices of different safety levels.

With reference to the first aspect, in some implementations of the first aspect, the foregoing method further includes starting a first CPU core of the first subsystem, so that the partition manager runs on the first CPU core of the first subsystem, the partition manager starts another CPU core of the first subsystem, after starting of the CPU core of the first subsystem is completed, the partition manager sequentially starts CPU cores of the second subsystem.

With reference to the first aspect, in some implementations of the first aspect, a memory of the second subsystem includes a shared memory, the shared memory is used to transmit data between the first subsystem and the second subsystem, the foregoing method further includes that the CPU core of the first subsystem stores first communication data generated by the first subsystem in the shared memory, and initiates a first interrupt, so that after receiving the first interrupt, the CPU core of the second subsystem reads the first communication data from the shared memory, or the CPU core of the second subsystem stores second communication data generated by the second subsystem in the shared memory, and initiates a second interrupt, so that after receiving the second interrupt, the CPU core of the first subsystem reads the second communication data from the shared memory.

In this application, data can be transmitted between the first subsystem and the second subsystem through the shared memory of the second subsystem, so that the first subsystem and the second subsystem are isolated while ensuring normal communication between the first subsystem and the second subsystem.

According to a second aspect, a communication method is provided, where the communication method is applied to a computer system, the computer system includes a first subsystem and a second subsystem, an operating system of the first subsystem is different from an operating system of the second subsystem, a CPU core of the first subsystem and a CPU core of the second subsystem are integrated on a same chip, the communication method includes obtaining a safety level configuration file of the computer system, configuring safety levels of the first subsystem and the second subsystem based on the safety level configuration file, so that a safety level of the CPU core of the first subsystem is higher than a safety level of the CPU core of the second subsystem, a safety level of an IO device of the first subsystem is higher than a safety level of an IO device of the second subsystem, and a safety level of a memory used by the first subsystem is higher than a safety level of a memory of the second subsystem.

The safety level configuration file of the computer system is used to indicate safety levels of devices in the first subsystem and the second subsystem, and safety levels of memories used by the first subsystem and the second subsystem.

The method according to the second aspect may be performed by a partition manager in the computer system, and the partition manager may be a module (software module or virtual module) implemented by software in the computer system.

Optionally, the foregoing computer system is a system in an unmanned driving system.

When the foregoing computer system is a system in an unmanned driving system, driving of the unmanned driving system can be controlled by the computer system.

It should be understood that in this application, a higher safety level indicates a higher safety degree.

In this application, after the safety level configuration file of the computer system is obtained, the safety levels of the first subsystem and the second subsystem can be configured based on the safety level configuration file of the computer system, so as to achieve safe isolation between the first subsystem and the second subsystem, thereby preventing an exception of the second subsystem from affecting normal operation of the first subsystem as far as possible.

Optionally, the foregoing safety level configuration file is a preconfigured file.

The foregoing safety level configuration file may be determined in advance based on a device status and an application requirement of the computer system. After the safety level configuration file is determined, the safety level configuration file may be written into a cache of the computer system, so that the partition manager easily obtains and parses the safety level configuration file subsequently.

Optionally, the foregoing safety level configuration file is obtained from the cloud.

Further, the foregoing safety level configuration file may be downloaded from the cloud by the computer system.

In addition, the foregoing safety level configuration file can be periodically or aperiodically updated or upgraded.

With reference to the second aspect, in some implementations of the second aspect, the configuring safety levels of the first subsystem and the second subsystem based on the safety level configuration file includes writing safety level information of a CPU core of the computer system into a safety level configuration module corresponding to the CPU core of the computer system.

The safety level information of the CPU core is used to indicate a safety level of the CPU core. The safety level configuration module corresponding to the CPU core may be located inside or outside the CPU.

The safety level configuration module corresponding to the CPU core may be a hardware module, and may be further implemented by a hardware circuit. The safety level configuration module is configured to process a signal output by the CPU core so that the processed signal includes the safety level information of the CPU core.

The writing safety level information of a CPU core into a safety level configuration module corresponding to the CPU core may be further writing the safety level information of the CPU core into a register corresponding to the safety level module corresponding to the CPU core. After the writing is completed, the safety level module corresponding to the CPU core can obtain the safety level information of the CPU core from the register.

With reference to the second aspect, in some implementations of the second aspect, the CPU core in the foregoing computer system is in a one-to-one correspondence with the safety level configuration module, and each safety level configuration module is configured to indicate a safety level of the corresponding CPU core.

When each CPU core corresponds to one safety level configuration module, a corresponding safety level can be relatively flexibly configured for each CPU core.

With reference to the second aspect, in some implementations of the second aspect, the safety level configuration module corresponding to each CPU core in the computer system is configured inside each CPU core.

When the safety level configuration module corresponding to the CPU core is configured inside the CPU core, the safety level configuration module can easily process a signal output by the CPU core, so that the processed signal includes the safety level information of the CPU core.

With reference to the second aspect, in some implementations of the second aspect, in the foregoing computer system, a CPU cluster is in a one-to-one correspondence with the safety level configuration module, the CPU cluster includes a plurality of CPU cores, and each safety level configuration module is configured to indicate safety levels of the plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

With reference to the second aspect, in some implementations of the second aspect, the safety level configuration module corresponding to each CPU cluster is configured in a protocol processing module L3_TAG of an L3 cache corresponding to each CPU cluster.

With reference to the second aspect, in some implementations of the second aspect, the foregoing first subsystem includes a memory access checker, the configuring safety levels of the first subsystem and the second subsystem based on the safety level configuration file includes writing memory safety level division information into the memory access checker.

The memory safety level division information is written into the memory access checker, so that the memory access checker can check and manage memory access based on the written memory safety level division information, facilitating subsequent memory isolation.

With reference to the second aspect, in some implementations of the second aspect, the configuring safety levels of the first subsystem and the second subsystem based on the safety level configuration file includes writing safety level information of an IO device into a safety level configuration and detection module corresponding to the IO device. The safety level configuration and detection module corresponding to the IO device is configured to detect the access request received by the IO device, to determine whether a safety level of a device that initiates the access request matches a safety level of the IO device.

The partition manager writes the safety level information of the IO device into the IO device, so that the safety level of the IO device can be configured, and a safety level configuration and detection module of the configured IO device can check the safety level of the device that initiates the access request, thereby achieving isolation between devices of different safety levels.

According to a third aspect, a communication method is provided, where the communication method is applied to a computer system, the computer system includes a first subsystem and a second subsystem, an operating system of the first subsystem is different from an operating system of the second subsystem, a CPU core of the first subsystem and a CPU core of the second subsystem are integrated on a same chip, and the communication method includes receiving safety level configuration information of the first subsystem and the second subsystem, to configure safety levels of the first subsystem and the second subsystem, so that a safety level of the CPU core of the first subsystem is higher than a safety level of the CPU core of the second subsystem, a safety level of an IO device of the first subsystem is higher than a safety level of an IO device of the second subsystem, and a safety level of a memory used by the first subsystem is higher than a safety level of a memory of the second subsystem.

In this application, after the safety level configuration information of the first subsystem and the second subsystem is received, the safety levels of the first subsystem and the second subsystem can be configured based on the safety level configuration information, so as to achieve safe isolation between the first subsystem and the second subsystem, thereby preventing an exception of the second subsystem from affecting normal operation of the first subsystem as far as possible.

With reference to the third aspect, in some implementations of the third aspect, the receiving safety level configuration information of the first subsystem and the second subsystem, to configure safety levels of the first subsystem and the second subsystem includes receiving safety level information of each CPU core in the computer system.

After the safety level information of each CPU core is received, a safety level of each CPU core in the computer system is configured.

With reference to the third aspect, in some implementations of the third aspect, a CPU core in the foregoing computer system is in a one-to-one correspondence with a safety level configuration module, and each safety level module is configured to indicate a safety level of the corresponding CPU core.

In other words, each CPU core may correspond to one safety level configuration module, and each safety level configuration module is configured to indicate a safety level of the corresponding CPU core. When each CPU core corresponds to one safety level configuration module, a corresponding safety level can be relatively flexibly configured for each CPU core.

With reference to the third aspect, in some implementations of the third aspect, the safety level configuration module corresponding to each CPU core is located inside each CPU core.

When the safety level configuration module corresponding to the CPU core is configured inside the CPU core, the safety level configuration module can easily process a signal output by the CPU core, so that the processed signal includes the safety level information of the CPU core.

With reference to the third aspect, in some implementations of the third aspect, a CPU cluster in the computer system is in a one-to-one correspondence with a safety level configuration module, and the safety level configuration module is configured to indicate safety levels of a plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

With reference to the third aspect, in some implementations of the third aspect, in the computer system, a safety level configuration module corresponding to any CPU cluster is configured in a protocol processing module L3_TAG of an L3 cache corresponding to any CPU cluster.

With reference to the third aspect, in some implementations of the third aspect, the receiving safety level configuration information of the first subsystem and the second subsystem, to configure safety levels of the first subsystem and the second subsystem includes receiving memory safety level division information, where the memory safety level division information is used to indicate safety levels of memories in different address segments of the computer system.

The memory safety level division information is received, so as to configure the safety levels of the memories in different address segments of the computer system.

With reference to the third aspect, in some implementations of the third aspect, the receiving safety level configuration information of the first subsystem and the second subsystem, to configure safety levels of the first subsystem and the second subsystem includes receiving safety level information of an IO device in the computer system, and detecting an access request received by the IO device, to determine whether a safety level of an access device that initiates the access request matches a safety level of the IO device.

With reference to the third aspect, in some implementations of the third aspect, the foregoing method further includes receiving an interrupt request initiated by an interrupt initiator, where the interrupt request carries safety level information of the interrupt initiator, and determining whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allowing the interrupt receiver to accept the interrupt request.

In this application, the interrupt controller can be configured to process the interrupt request, so that when the safety level of the interrupt initiator matches the safety level of the interrupt receiver, the interrupt receiver accepts the interrupt request, thereby achieving isolation between the interrupt initiator and the interrupt receiver when the interrupt request is processed normally.

With reference to the third aspect, in some implementations of the third aspect, determining, based on the safety level configuration information of the first subsystem and the second subsystem and the interrupt request, whether the safety level of the interrupt initiator matches a safety level of an interrupt target device to be accessed by the interrupt device includes when both the interrupt initiator and the interrupt target device belong to the first subsystem, determining that the safety level of the interrupt initiator matches the safety level of the interrupt target device, or when both the interrupt initiator and the interrupt target device belong to the second subsystem, determining that the safety level of the interrupt initiator matches the safety level of the interrupt target device.

When the safety level of the interrupt initiator is higher than or equal to the safety level of the interrupt receiver, the interrupt receiver is allowed to receive the interrupt request initiated by the interrupt initiator, so as to prevent a device with a high safety level from receiving or processing an interrupt request initiated by a device with a low safety level. This prevents an exception of the device with a low safety level from affecting the device with a high safety level as far as possible.

With reference to the third aspect, in some implementations of the third aspect, when the safety level of the memory access initiator is lower than the safety level of the memory to be accessed by the memory access initiator, it is determined that the safety level of the memory to be accessed by the memory access initiator does not match the safety level of the memory access initiator.

With reference to the third aspect, in some implementations of the third aspect, the foregoing method further includes receiving a memory access request from a memory access initiator, where the memory access request carries a memory address to be accessed by the memory access initiator and safety level information of the memory access initiator, and when a safety level of a memory to be accessed by the memory access initiator matches a safety level of the memory access initiator, allowing the memory access initiator to access the memory address to be accessed by the memory access initiator, where the memory safety level division information is used to indicate safety levels of memories in different segments.

With reference to the third aspect, in some implementations of the third aspect, that the safety level of the memory to be accessed by the memory access initiator matches the safety level of the memory access initiator includes the safety level of the memory access initiator is higher than or equal to the safety level of the memory to be accessed by the memory access initiator.

Because the memory access initiator can access only a memory with the same safety level or a lower safety level, it is possible to prevent a device in a low-safety system from accessing a memory with a higher safety level as far as possible, thereby achieving isolation of the memory to some extent.

According to a fourth aspect, a communication method is provided, where the communication method is applied to a computer system, the computer system includes a first subsystem and a second subsystem, an operating system of the first subsystem is different from an operating system of the second subsystem, a CPU core of the first subsystem and a CPU core of the second subsystem are integrated on a same chip, and the communication method includes an IO device receives an access request from an access device, where the access request carries safety level information of the access device, and the IO device is any IO device in the first subsystem or the second subsystem, and when a safety level of the access device matches a safety level of the IO device, the IO device allows the access device to access the IO device.

With reference to the fourth aspect, in some implementations of the fourth aspect, that the safety level of the access device matches the safety level of the IO device includes that the safety level of the access device is higher than or equal to the safety level of the IO device.

According to a fifth aspect, a computer system is provided, where the computer system includes a first subsystem and a second subsystem, the first subsystem and the second subsystem are used to perform the method in the first aspect.

According to a sixth aspect, a processing apparatus is provided, where the processing apparatus includes modules for performing the method in the second aspect.

According to a seventh aspect, a processing apparatus is provided, where the processing apparatus includes modules for performing the method in the third aspect.

According to an eighth aspect, a processing apparatus is provided, where the processing apparatus includes modules for performing the method in the fourth aspect.

The processing apparatus in the sixth aspect, the seventh aspect, and the eighth aspect may be a chip in the computer system in the first aspect.

According to a ninth aspect, a computer-readable storage medium is provided, where the computer-readable storage medium stores program code, and the program code includes an instruction for performing a step in any method in the second aspect.

According to a tenth aspect, a computer program product including an instruction is provided, where when the computer program product runs on a computer, the computer is enabled to perform any method in the second aspect.

According to an eleventh aspect, a chip is provided, where the chip includes a processor and a data interface, and the processor reads an instruction stored in a memory through the data interface, to perform any method in the second aspect.

Optionally, in an implementation, the chip may further include a memory and the memory stores an instruction, the processor is configured to execute the instruction stored in the memory, and when the instruction is executed, the processor is configured to perform any method in the second aspect.

The foregoing chip may be a field-programmable gate array (FPGA) or an application-specific integrated circuit (ASIC).

DESCRIPTION OF EMBODIMENTS

The following describes technical solutions of this application with reference to accompanying drawings.

A computer system in this application may be located in an autonomous driving system. When the computer system is located in the autonomous driving system, (partitioning) isolation of different subsystems in the computer system is essentially isolation of different subsystems in the autonomous driving system.

The following uses the autonomous driving system as an example to describe the partitioning and isolation of the autonomous driving system. For subsystems of different safety levels in the autonomous driving system, it is necessary to achieve complete isolation between the subsystems of different safety levels, and to implement communication between different subsystems during normal operation. The following describes the partitioning and isolation of the autonomous driving system with reference to FIG. 1.

Figure 1:
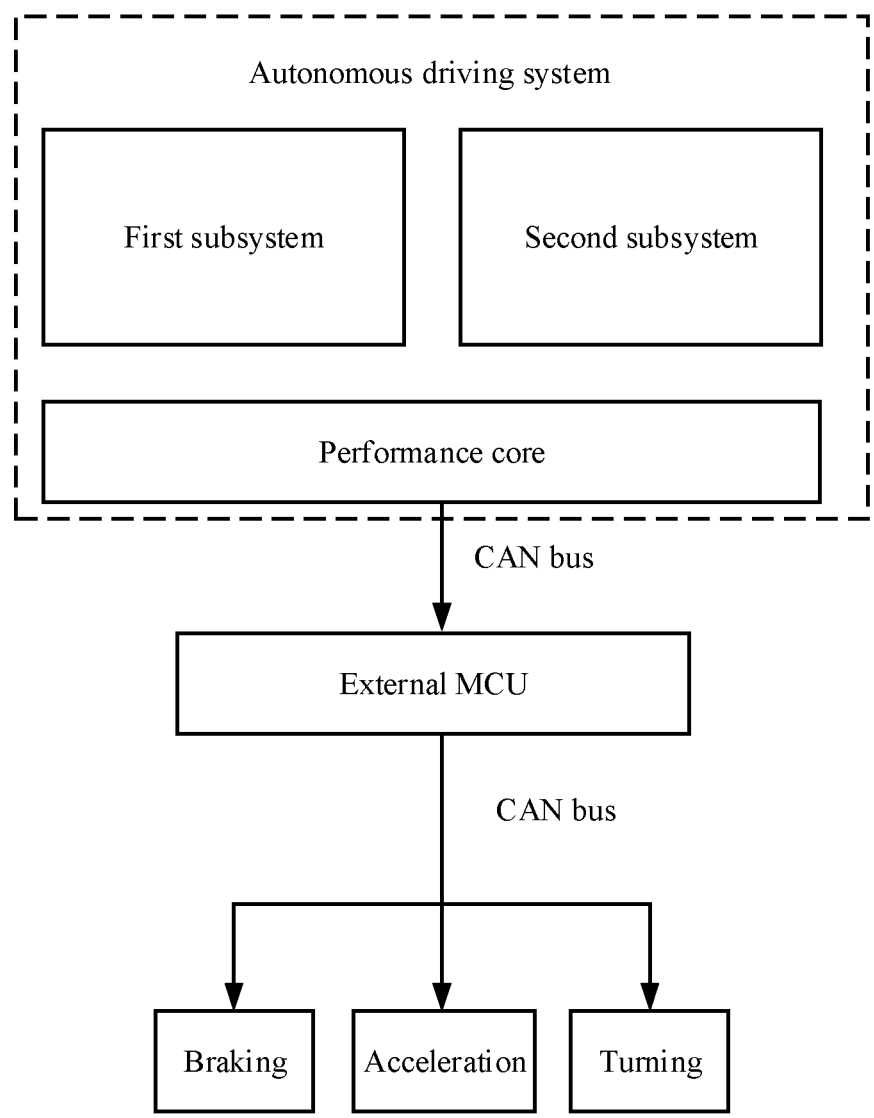
FIG. 1 is a schematic diagram of an autonomous driving system.

As shown in FIG. 1, the autonomous driving system includes a first subsystem and a second subsystem. The first subsystem is used to identify an object, and the second subsystem is used to control a vehicle (control braking, acceleration, turning, and the like of the vehicle). If the first subsystem identifies an obstacle in front of the vehicle, the first subsystem notifies the second subsystem to control the vehicle to brake. After the notification command is sent, if the first subsystem is faulty, the fault may cause a failure of the second subsystem to work normally. Consequently, a braking command of the second subsystem is not executed properly, and in the end, the vehicle may hit an obstacle and a traffic accident occurs.

Therefore, in the autonomous driving system shown in FIG. 1, to achieve safe driving, the first subsystem and the second subsystem need to be isolated, so that when one of the subsystems is faulty, the other subsystem can still work normally.

Figure 2:
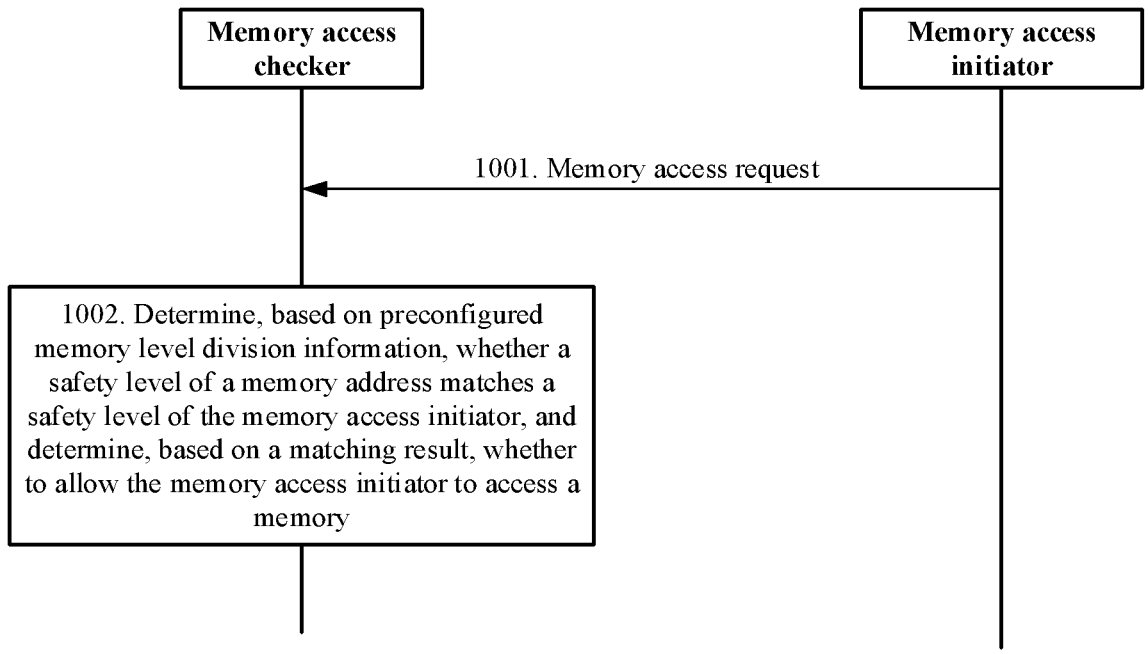
FIG. 2 is a schematic flowchart of a communication method according to an embodiment of this application.

The following describes in detail a communication method in an embodiment of this application with reference to FIG. 2. The communication method shown in FIG. 2 may be performed by a device in a computer system. The method shown in FIG. 2 may be applied to a computer system, the computer system includes a first subsystem and a second subsystem, a safety level of the first subsystem is higher than a safety level of the second subsystem, a CPU core of the first subsystem, a CPU core of the second subsystem, and a memory access checker are integrated on a same chip. The computer system includes an interrupt controller, and the interrupt controller is shared by the first subsystem and the second subsystem, interrupt routing configuration information stored in the interrupt controller is configured by the CPU core of the first subsystem, and the interrupt routing configuration information is used to indicate a CPU core that responds to each interrupt, the first subsystem further includes a memory access checker.

The method shown in FIG. 2 includes steps 1001 and 1002, and steps 1001 and 1002 are described in detail below.

1001. A memory access initiator sends a memory access request to the memory access checker, and the memory access checker receives the memory access request from the memory access initiator.

The memory access request carries a memory address to be accessed by the memory access initiator and safety level information of the memory access initiator.

1002. The memory access checker determines, based on preconfigured memory safety level division information, whether a safety level of a memory to be accessed by the memory access initiator matches a safety level of the memory access initiator, and determines, based on a matching result, whether to allow the memory access initiator to access the memory.

Further, when the safety level of the memory to be accessed by the memory access initiator matches the safety level of the memory access initiator, the memory access initiator is allowed to access the memory, when the safety level of the memory to be accessed by the memory access initiator does not match the safety level of the memory access initiator, the memory access initiator is not allowed to access the memory.

The foregoing memory safety level division information is used to indicate safety levels of memories in different address segments of the computer system.

Optionally, the foregoing computer system is a system in an unmanned driving system.

When the foregoing computer system is a system in an unmanned driving system, driving of the unmanned driving system can be controlled by the computer system.

It should be understood that in this application, a higher safety level indicates a higher safety degree.

Optionally, the foregoing method further includes when the safety level of the memory to be accessed by the memory access initiator does not match the safety level of the memory access initiator, disallowing the memory access initiator to access the memory.

In this application, the memory access checker is configured in a subsystem with a high safety level, and the memory of the computer system is divided based on a safety level, so as to achieve good isolation between different subsystems of the computer system, thereby preventing an exception of a subsystem from affecting normal operation of another subsystem as far as possible.

It should be understood that in this application, the computer system may further include another subsystem in addition to the first subsystem and the second subsystem, and a quantity of subsystems included in the computer system is not limited in this application. When the computer system includes another subsystem, a safety level can be configured for the other subsystem in a similar manner as that for the first subsystem or the second subsystem.

In this application, the second subsystem may be subdivided into at least two microsystems, and then the at least two microsystems are configured in the manner of configuring the first subsystem and the second subsystem.

For example, the second subsystem may be subdivided into a first microsystem and a second microsystem, and safety levels of the first microsystem and the second microsystem are configured in the foregoing manner of configuring the first subsystem and the second subsystem, so that the safety level of the first microsystem is higher than the safety level of the second micro system.

In the foregoing computer system, in addition to isolating the memories accessed by the first subsystem and the second subsystem, devices of the first subsystem and the second subsystem may also be isolated.

Figure 3:
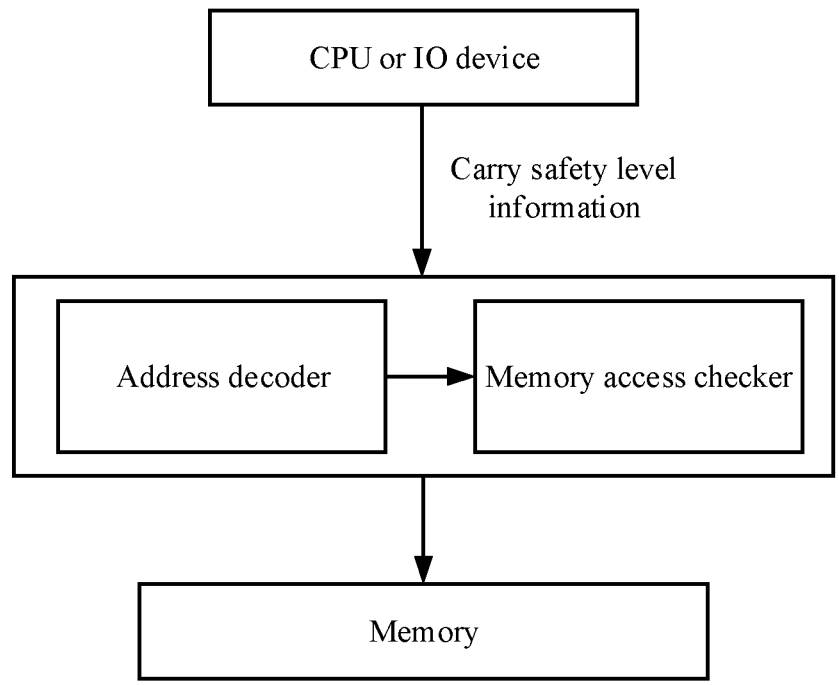
FIG. 3 is a schematic diagram of a process of processing a memory access request by a memory access checker.

The following describes in detail a process of processing a memory access request by a memory access checker with reference to FIG. 3.

As shown in FIG. 3, when a CPU or an IO device accesses a memory as a master device, an access request of the CPU or the IO device carries a safety level signal. The access request first reaches an address decoder for decoding, so as to obtain a memory access address and the safety level signal carried in the access request. Next, the memory access checker checks a safety level of the safety level signal carried in the access request. Only a memory access request with a matched safety level is allowed to access the memory. Otherwise, a safety interrupt is reported.

In this application, the IO device can further determine whether the safety level of the access device matches the safety level of the IO device based on the access request of the access device, and allow access of the access device only when the safety level of the access device matches the safety level of the IO device. The following provides a detailed description with reference to FIG. 4.

Figure 4:
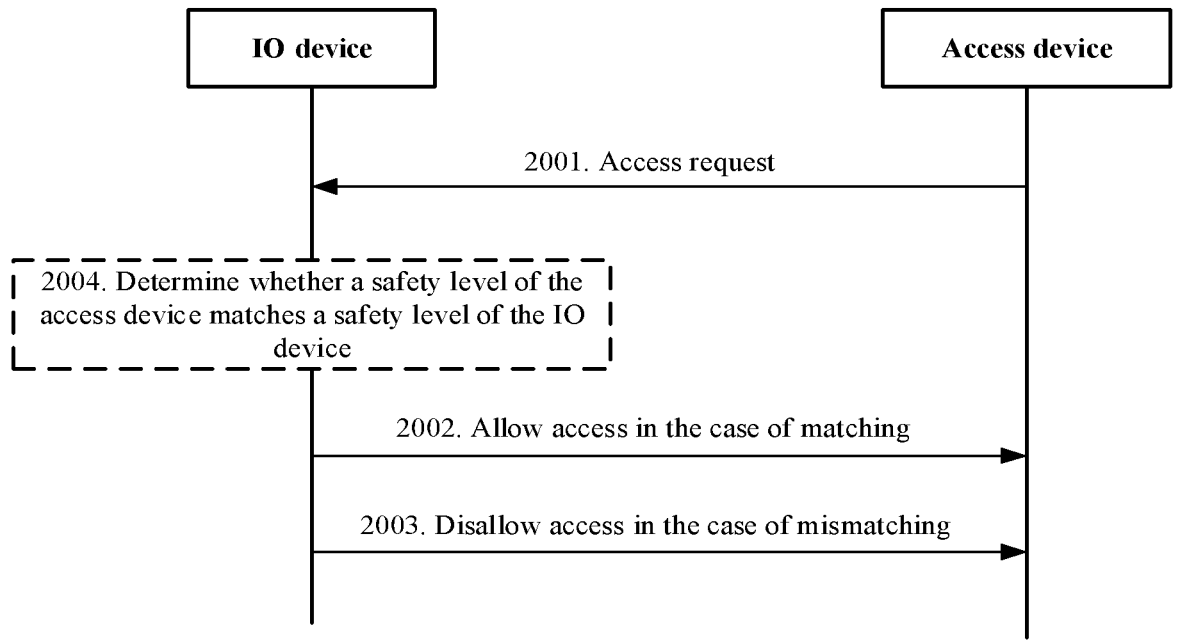
FIG. 4 is a schematic diagram of a process in which an IO device determines whether to accept access from an access device.

As shown in FIG. 4, the process in which the IO device determines whether to accept the access of the access device includes steps 2001 to 2003, which are described below.

2001. The IO device receives an access request from the access device.

The access request carries safety level information of the access device, and the IO device is any IO device in the first subsystem or the second subsystem.

2002. When a safety level of the access device matches a safety level of the IO device, the IO device allows the access device to access the IO device.

2003. When a safety level of the access device does not match a safety level of the IO device, the IO device does not allow the access device to access the IO device.

It should be understood that in an actual execution process, for the same access device, the IO device performs step 2002 or 2003.

Further, before steps 2002 and 2003, the process shown in FIG. 4 may further include step 2004.

2004. Determine whether a safety level of the access device matches a safety level of the IO device.

Further, in step 2004, the IO device may obtain the safety level of the access device based on the access request of the access device, and then determine whether the safety level of the access device matches the safety level of the IO device based on the safety level of the access device and the safety level of the IO device.

In this application, the IO device accepts the access of the access device only when the safety level of the access device matches the safety level of the IO device, if the safety level of the access device does not match the IO device, the IO device does not accept the access of the IO device, so as to achieve a specific degree of isolation between the access device and the IO device, and prevent an access device whose safety level does not match the IO device from accessing the IO device.

Optionally, that the safety level of the access device matches the safety level of the IO device includes that the safety level of the access device is higher than or equal to the safety level of the IO device.

In this application, the access device is allowed to access the IO device only when the safety level of the access device is higher than or equal to the safety level of the IO device, in other words, a device with a high safety level can access a device with the same safety level or a lower safety level, so that a device with a lower safety level cannot access a device with a higher safety level, thereby achieving a specific degree of isolation between the access device and the IO device.

Further, because a device with a low safety level cannot access a device with a high safety level, this can prevent an exception of the device with a low safety level from affecting the device with a high safety level.

Figure 5:
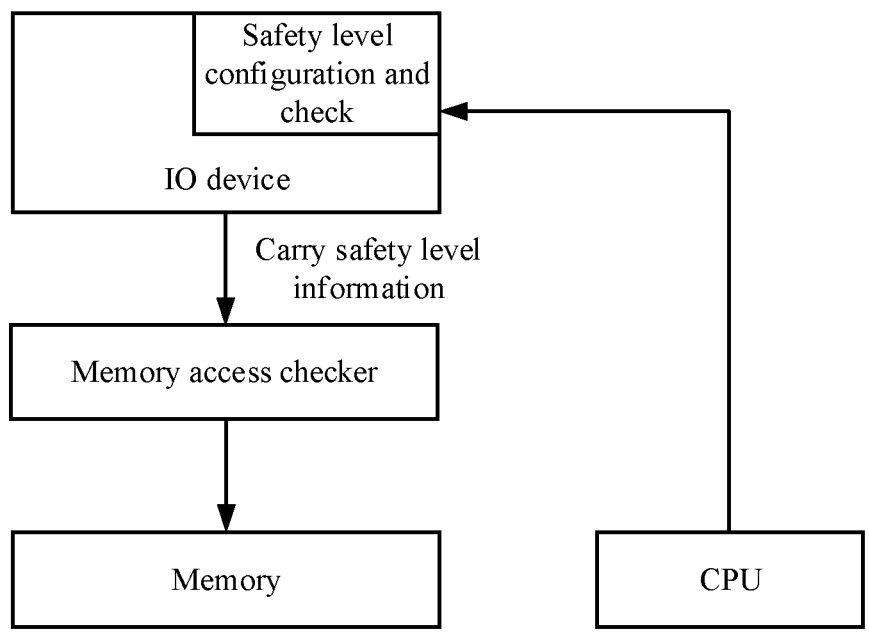
FIG. 5 is a schematic diagram of accessing a memory by an IO device.

For each IO device, a configuration register can be added to store the safety level of the IO device. As shown in FIG. 5, when the IO device accesses the memory as the master device, the safety level information of the IO device is transmitted with a hardware signal over an address bus. When the hardware signal passes through the memory access checker, the memory access checker checks the safety level of the hardware signal.

Similarly, as shown in FIG. 5, when the CPU core accesses the IO device, the IO device checks the safety level of the access request of the CPU core. The CPU core is allowed to access the IO device only when the safety level of the CPU core matches the safety level of the IO device.

In addition to isolating the memories accessed by the first subsystem and the second subsystem, and the devices of the first subsystem and the second subsystem, the interrupt request may be isolated.

Optionally, the method shown in FIG. 2 further includes an interrupt controller receives an interrupt request from an interrupt initiator, where the interrupt request carries safety level information of the interrupt initiator, the interrupt controller determines whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allows the interrupt receiver to accept the interrupt request.

In this application, the interrupt controller can be configured to process the interrupt request, so that when the safety level of the interrupt initiator matches the safety level of the interrupt receiver, the interrupt receiver accepts the interrupt request, thereby achieving isolation between the interrupt initiator and the interrupt receiver when the interrupt request is processed normally.

Optionally, that the safety level of the interrupt initiator matches the safety level of the interrupt receiver includes both the interrupt initiator and the interrupt receiver belong to the first subsystem, both the interrupt initiator and the interrupt receiver belong to the second subsystem, or the interrupt initiator belongs to the first subsystem and the interrupt receiver belongs to the second subsystem.

When the safety level of the interrupt initiator is higher than or equal to the safety level of the interrupt receiver, the interrupt receiver is allowed to receive the interrupt request initiated by the interrupt initiator, so as to prevent a device with a high safety level from receiving or processing an interrupt request initiated by a device with a low safety level. This prevents an exception of the device with a low safety level from affecting the device with a high safety level as far as possible.

Optionally, that the safety level of the interrupt initiator does not match the safety level of the interrupt receiver includes that the interrupt initiator belongs to the second subsystem and the interrupt receiving device belongs to the first subsystem.

When the safety level of the interrupt initiator is lower than the safety level of the interrupt receiver, the interrupt receiver does not accept the interrupt request of the interrupt initiator. In this way, when a device in a low-safety system is faulty, interference caused to a device in a high-safety system can be avoided as far as possible.

Optionally, that the safety level of the memory to be accessed by the memory access initiator matches the safety level of the memory access initiator includes that the safety level of the memory access initiator is higher than or equal to the safety level of the memory to be accessed by the memory access initiator.

Because the memory access initiator can access only a memory with the same safety level or a lower safety level, it is possible to prevent a device in a low-safety system from accessing a memory with a higher safety level as far as possible, thereby achieving isolation of the memory to some extent.

Optionally, when the safety level of the memory access initiator is lower than the safety level of the memory to be accessed by the memory access initiator, it is determined that the safety level of the memory to be accessed by the memory access initiator does not match the safety level of the memory access initiator.

The first subsystem further includes a partition manager, and the method shown in FIG. 2 further includes the partition manager configures safety levels for devices in the first subsystem and the second subsystem based on a safety level configuration file of the computer system.

The safety level configuration file of the computer system is used to indicate the safety levels of the devices in the first subsystem and the second subsystem, and safety levels of memories used by the first subsystem and the second subsystem.

The partition manager can be configured to configure safety levels of the first subsystem and the second subsystem, so as to achieve isolation between the first subsystem and the second subsystem.

It should be understood that before configuring the safety levels of the first subsystem and the second subsystem, the partition manager may first obtain and parse the safety level configuration file of the computer system, then, after obtaining the safety levels of the devices in the first subsystem and the second subsystem and the safety levels of the memories used by the first subsystem and the second subsystem, the partition manager configures the safety levels of the first subsystem and the second subsystem.

Optionally, the foregoing safety level configuration file is a preconfigured file.

Further, the foregoing safety level configuration file may be determined in advance based on a device status and an application requirement of the computer system. After the safety level configuration file is determined, the safety level configuration file may be written into a cache of the computer system, so that the partition manager easily obtains and parses the safety level configuration file subsequently.

Optionally, the foregoing safety level configuration file is obtained from the cloud.

Further, the foregoing safety level configuration file may be downloaded from the cloud by the computer system.

In addition, the foregoing safety level configuration file can be periodically or aperiodically updated or upgraded.

With reference to the first aspect, in some implementations of the first aspect, that the partition manager configures the safety levels for the devices in the first subsystem and the second subsystem based on the safety level configuration file includes the partition manager writes safety level information of a CPU core into a safety level configuration module corresponding to the CPU core.

The safety level information of the CPU core is used to indicate a safety level of the CPU core. The safety level configuration module corresponding to the CPU core may be located inside or outside the CPU.

The safety level configuration module corresponding to the CPU core may be a hardware module, and may be implemented by a hardware circuit. The safety level configuration module is configured to process a signal output by the CPU core so that the processed signal includes the safety level information of the CPU core.

That the foregoing partition manager writes the safety level information of the CPU core into the safety level configuration module corresponding to the CPU core may be writing the safety level information of the CPU core into a register corresponding to the safety level module corresponding to the CPU core. After the writing is completed, the safety level module corresponding to the CPU core can obtain the safety level information of the CPU core from the register.

Optionally, in the foregoing computer system, the CPU core is in a one-to-one correspondence with the safety level configuration module, and each safety level configuration module is configured to indicate a safety level of the corresponding CPU core.

In other words, each CPU core may correspond to one safety level configuration module, and each safety level configuration module is configured to indicate a safety level of the corresponding CPU core. When each CPU core corresponds to one safety level configuration module, a corresponding safety level can be relatively flexibly configured for each CPU core.

Optionally, the safety level configuration module corresponding to the CPU core is configured inside the CPU core.

When the safety level configuration module corresponding to the CPU core is configured inside the CPU core, the safety level configuration module can easily process a signal output by the CPU core, so that the processed signal includes the safety level information of the CPU core.

Figure 6:
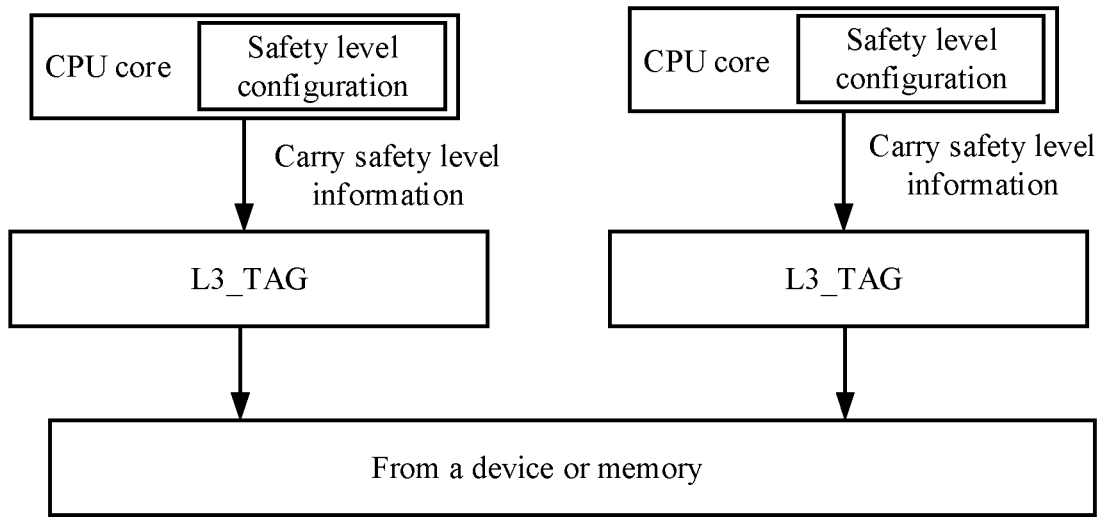
FIG. 6 is a schematic diagram in which each CPU core corresponds to one safety level configuration module.

As shown in FIG. 6, each CPU core is provided with a safety level configuration module, so that after the configuration is completed, a signal sent by each CPU core carries corresponding safety level information.

It is assumed that a CPU core shown in FIG. 6 is a CPU core in an autonomous driving system, a safety level configuration module of a CPU core on the left side of FIG. 6 is configured to be at the ASIL-D level, and a safety level configuration module of a CPU core on the right side of FIG. 6 is configured to be at the ASIL-B level. Then, a signal of the CPU on the left side carries information of the high safety level ASIL-D, and a signal of the CPU on the right side carries information of the low safety level ASIL-B.

It should be understood that the safety level configuration module corresponding to each CPU core may also be located outside the CPU core. In this case, a signal sent by a CPU core may also pass through a safety level module corresponding to the CPU core. The safety level module corresponding to the CPU core adds safety level information of the CPU core to the signal sent by the CPU core.

In addition to configuring the safety level of the CPU on a per-CPU basis, the safety level of the CPU may be configured at a granularity of a CPU cluster.

Optionally, in the foregoing computer system, a CPU cluster is in a one-to-one correspondence with the safety level configuration module, the CPU cluster includes a plurality of CPU cores, and the safety level configuration module is configured to indicate safety levels of the plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

Optionally, the safety level configuration module corresponding to the CPU cluster is configured in a protocol processing module L3_TAG of an L3 cache corresponding to the CPU cluster.

Optionally, that the partition manager configures the safety levels for the devices in the first subsystem and the second subsystem based on the safety level configuration file includes that the partition manager writes the memory safety level division information into the memory access checker.

The partition manager writes the memory safety level division information into the memory access checker, so that the memory access checker can check and manage memory access based on the written memory safety level division information, facilitating subsequent memory isolation.

In this application, a hardware module may be added to an L3_TAG module (L3_TAG is a protocol processing module of the L3 cache, including all other functions other than data storage) in an L3 cache outside the CPU cluster. This module can configure a safety level of a CPU inside the CPU cluster.

Figure 7:
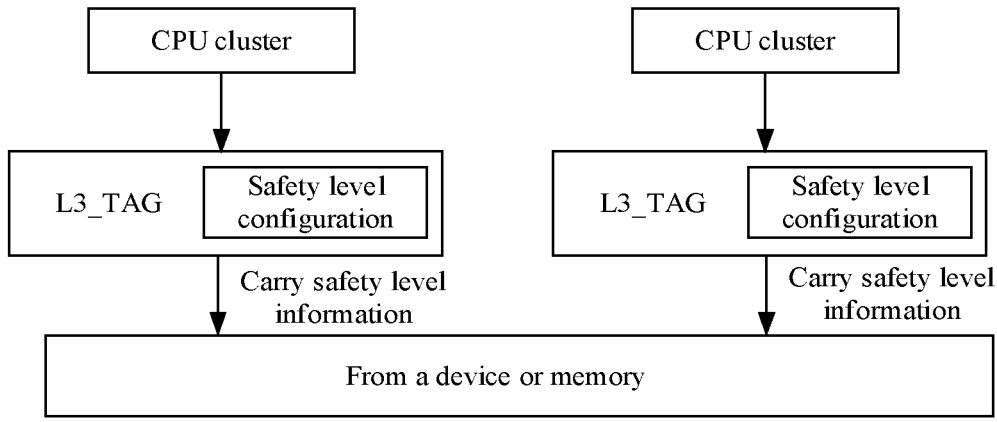
FIG. 7 is a schematic diagram in which each CPU cluster corresponds to one safety level configuration module.

As shown in FIG. 7, one CPU cluster corresponds to one L3_TAG, and a safety level configuration module is added to the L3_TAG. One safety level configuration module is configured to indicate safety levels of a plurality of CPU cores in the corresponding CPU cluster.

For example, when the safety level module in the L3_TAG in FIG. 7 is configured to be at the ASIL-D level, a signal of each CPU carries information of the high safety level ASIL-D after passing through the L3_TAG, similarly, when the safety level module in the L3_TAG is configured to be at ASIL-B or QM, a signal of each CPU carries information of the low safety level ASIL-B or QM after passing through the L3_TAG.

Optionally, that the partition manager configures the safety levels for the devices in the first subsystem and the second subsystem based on the safety level configuration file includes that the partition manager writes safety level information of an IO device into a safety level configuration and detection module corresponding to the IO device. The safety level configuration and detection module corresponding to the IO device is configured to detect the access request received by the IO device, to determine whether a safety level of a device that initiates the access request matches a safety level of the IO device.

The partition manager writes the safety level information of the IO device into the IO device, so that the safety level of the IO device can be configured, and a safety level configuration and detection module of the configured IO device can check the safety level of the device that initiates the access request, thereby achieving isolation between devices of different safety levels.

Optionally, the method shown in FIG. 2 further includes starting a first CPU core of the first subsystem, so that the partition manager runs on the first CPU core of the first subsystem, the partition manager starts another CPU core of the first subsystem, after starting of the CPU core of the first subsystem is completed, the partition manager sequentially starts CPU cores of the second subsystem.

Optionally, a memory of the second subsystem includes a shared memory, the shared memory is used to transmit data between the first subsystem and the second subsystem, the foregoing method further includes that the CPU core of the first subsystem stores first communication data generated by the first subsystem in the shared memory, and initiates a first interrupt, so that after receiving the first interrupt, the CPU core of the second subsystem reads the first communication data from the shared memory, or the CPU core of the second subsystem stores second communication data generated by the second subsystem in the shared memory, and initiates a second interrupt, so that after receiving the second interrupt, the CPU core of the first subsystem reads the second communication data from the shared memory.

In this application, data can be transmitted between the first subsystem and the second subsystem through the shared memory of the second subsystem, so that the first subsystem and the second subsystem are isolated while ensuring normal communication between the first subsystem and the second subsystem.

Figure 8:
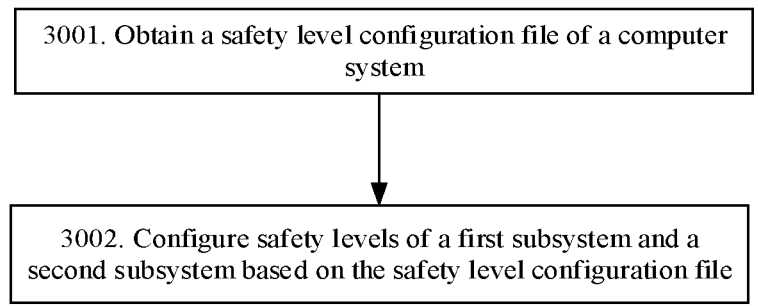
FIG. 8 is a schematic flowchart of a communication method according to an embodiment of this application.

The following describes in detail the communication method in the embodiments of this application with reference to FIG. 8.

FIG. 8 is a schematic flowchart of a communication method according to an embodiment of this application. The communication method shown in FIG. 8 is applied to a computer system, the computer system includes a first subsystem and a second subsystem, an operating system of the first subsystem is different from an operating system of the second subsystem, a CPU core of the first subsystem and a CPU core of the second subsystem are integrated on a same chip.

The method shown in FIG. 8 includes steps 3001 and 3002, and the two steps are described in detail below.

3001. Obtain a safety level configuration file of the computer system.

The safety level configuration file of the computer system is used to indicate safety levels of devices in the first subsystem and the second subsystem, and safety levels of memories used by the first subsystem and the second subsystem.

3002. Configure safety levels of the first subsystem and the second subsystem based on the safety level configuration file, so that a safety level of the CPU core of the first subsystem is higher than a safety level of the CPU core of the second subsystem, a safety level of an IO device of the first subsystem is higher than a safety level of an IO device of the second subsystem, and a safety level of a memory used by the first subsystem is higher than a safety level of a memory of the second subsystem.

The method shown in FIG. 8 may be performed by a partition manager in the computer system, and the partition manager may be a module (software module or virtual module) implemented by software in the computer system.

Optionally, the foregoing computer system is a system in an unmanned driving system.

When the foregoing computer system is a system in an unmanned driving system, driving of the unmanned driving system can be controlled by the computer system.

It should be understood that in this application, a higher safety level indicates a higher safety degree.

In this application, after the safety level configuration file of the computer system is obtained, the safety levels of the first subsystem and the second subsystem can be configured based on the safety level configuration file of the computer system, so as to achieve safe isolation between the first subsystem and the second subsystem, thereby preventing an exception of the second subsystem from affecting normal operation of the first subsystem as far as possible.

Optionally, the foregoing safety level configuration file is a preconfigured file.

The foregoing safety level configuration file may be determined in advance based on a device status and an application requirement of the computer system. After the safety level configuration file is determined, the safety level configuration file may be written into a cache of the computer system, so that the partition manager easily obtains and parses the safety level configuration file subsequently.

Optionally, the foregoing safety level configuration file is obtained from the cloud.

The foregoing safety level configuration file may be downloaded from the cloud by the computer system.

In addition, the foregoing safety level configuration file can be periodically or aperiodically updated or upgraded.

Optionally, step 3002 further includes the following.

3002*a*. Write safety level information of a CPU core of the computer system into a safety level configuration module corresponding to the CPU core of the computer system.

The safety level information of the CPU core is used to indicate a safety level of the CPU core. The safety level configuration module corresponding to the CPU core may be located inside or outside the CPU.

The safety level configuration module corresponding to the CPU core may be a hardware module, and may be implemented by a hardware circuit. The safety level configuration module is configured to process a signal output by the CPU core so that the processed signal includes the safety level information of the CPU core.

The writing safety level information of a CPU core into a safety level configuration module corresponding to the CPU core may be writing the safety level information of the CPU core into a register corresponding to the safety level module corresponding to the CPU core. After the writing is completed, the safety level module corresponding to the CPU core can obtain the safety level information of the CPU core from the register.

Optionally, the CPU core in the foregoing computer system is in a one-to-one correspondence with the safety level configuration module, and each safety level configuration module is configured to indicate a safety level of the corresponding CPU core.

When each CPU core corresponds to one safety level configuration module, a corresponding safety level can be relatively flexibly configured for each CPU core.

Optionally, the safety level configuration module corresponding to each CPU core in the foregoing computer system is configured inside each CPU core.

When the safety level configuration module corresponding to the CPU core is configured inside the CPU core, the safety level configuration module can easily process a signal output by the CPU core, so that the processed signal includes the safety level information of the CPU core.

Optionally, in the foregoing computer system, a CPU cluster is in a one-to-one correspondence with the safety level configuration module, the CPU cluster includes a plurality of CPU cores, and each safety level configuration module is configured to indicate safety levels of the plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

Optionally, the safety level configuration module corresponding to each CPU cluster is configured in a protocol processing module L3_TAG of an L3 cache corresponding to each CPU cluster.

Optionally, the foregoing first subsystem includes a memory access checker, and step 3002 includes the following.

3002*b*. Write the memory safety level division information into the memory access checker.

The memory safety level division information is written into the memory access checker, so that the memory access checker can check and manage memory access based on the written memory safety level division information, facilitating subsequent memory isolation.

Optionally, step 3002 includes the following.

3002*c*. Write safety level information of an IO device into a safety level configuration and detection module corresponding to the IO device, where the safety level configuration and detection module corresponding to the IO device is configured to detect an access request received by the IO device, to determine whether a safety level of a device that initiates the access request matches a safety level of the IO device.

The partition manager writes the safety level information of the IO device into the IO device, so that the safety level of the IO device can be configured, and a safety level configuration and detection module of the configured IO device can check the safety level of the device that initiates the access request, thereby achieving isolation between devices of different safety levels.

Figure 9:
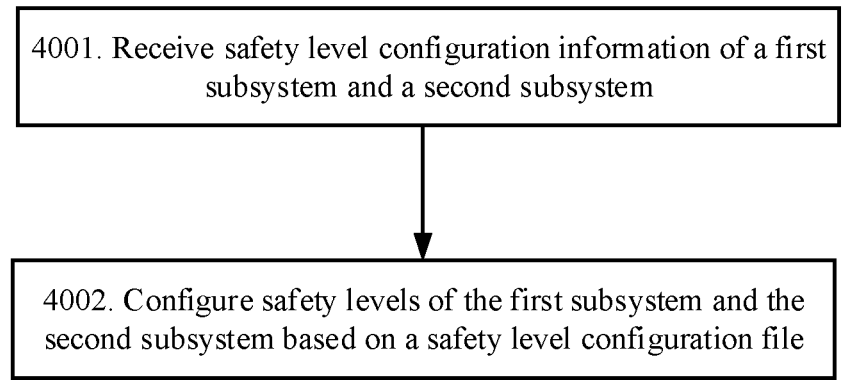
FIG. 9 is a schematic flowchart of a communication method according to an embodiment of this application.

The following describes in detail the communication method in the embodiments of this application with reference to FIG. 9.

FIG. 9 is a schematic flowchart of a communication method according to an embodiment of this application. The communication method shown in FIG. 9 is applied to a computer system, the computer system includes a first subsystem and a second subsystem, an operating system of the first subsystem is different from an operating system of the second subsystem, a CPU core of the first subsystem and a CPU core of the second subsystem are integrated on a same chip.

The method shown in FIG. 9 includes steps 4001 and 4002, and the two steps are described in detail below.

4001. Receive safety level configuration information of the first subsystem and the second subsystem.

4002. Configure safety levels of the first subsystem and the second subsystem based on the safety level configuration information of the first subsystem and the second subsystem.

It should be understood that, step 4002 can ensure that a safety level of the CPU core of the first subsystem is higher than a safety level of the CPU core of the second subsystem, a safety level of an IO device of the first subsystem is higher than a safety level of an IO device of the second subsystem, and a safety level of a memory used by the first subsystem is higher than a safety level of a memory of the second subsystem.

In this application, after the safety level configuration information of the first subsystem and the second subsystem is received, the safety levels of the first subsystem and the second subsystem can be configured based on the safety level configuration information, so as to achieve safe isolation between the first subsystem and the second subsystem, thereby preventing an exception of the second subsystem from affecting normal operation of the first subsystem as far as possible.

Optionally, step 4001 further includes the following.

4001*a*. Receive safety level information of each CPU core in the computer system.

After the safety level information of each CPU core is received, a safety level of each CPU core in the computer system is configured.

Optionally, the CPU core in the foregoing computer system is in a one-to-one correspondence with the safety level configuration module, and each safety level configuration module is configured to indicate a safety level of the corresponding CPU core.

When each CPU core corresponds to one safety level configuration module, a corresponding safety level can be relatively flexibly configured for each CPU core.

Optionally, the safety level configuration module corresponding to each CPU core is located inside each CPU core.

When the safety level configuration module corresponding to the CPU core is configured inside the CPU core, the safety level configuration module can easily process a signal output by the CPU core, so that the processed signal includes the safety level information of the CPU core.

Optionally, a CPU cluster in the foregoing computer system is in a one-to-one correspondence with the safety level configuration module, and the safety level configuration module is configured to indicate safety levels of a plurality of CPU cores in the corresponding CPU cluster.

Each CPU cluster may correspond to one safety level configuration module, and each safety level configuration module is configured to indicate a safety level of the corresponding CPU cluster. When each CPU cluster corresponds to one safety level configuration module, a quantity of safety level configuration modules can be reduced, thereby simplifying complexity of the computer system.

Optionally, in the computer system, the safety level configuration module corresponding to any CPU cluster is configured in a protocol processing module L3_TAG of an L3 cache corresponding to any CPU cluster.

Optionally, step 4001 further includes the following.

4001*b*. Receive memory safety level division information, where the memory safety level division information is used to indicate safety levels of memories in different address segments of the computer system.

The memory safety level division information is received, so as to configure the safety levels of the memories in different address segments of the computer system.

Optionally, step 4001 further includes the following.

4001*c*. Receive safety level information of an IO device in the computer system, and detect an access request received by the IO device, to determine whether a safety level of an access device that initiates the access request matches a safety level of the IO device.

Optionally, the method shown in FIG. 9 further includes the following.

4003. Receive an interrupt request initiated by an interrupt initiator, where the interrupt request carries safety level information of the interrupt initiator.

4004. Determine whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allow the interrupt receiver to accept the interrupt request.

In this application, the interrupt controller can be configured to process the interrupt request, so that when the safety level of the interrupt initiator matches the safety level of the interrupt receiver, the interrupt receiver accepts the interrupt request, thereby achieving isolation between the interrupt initiator and the interrupt receiver when the interrupt request is processed normally.

It should be understood that the safety level information configured in step 4004 includes safety level information of the two subsystems the first subsystem and the second sub system.

Optionally, step 4004 further includes the following.

4004*a*. When both the interrupt initiator and the interrupt target device belong to the first subsystem, determine that the safety level of the interrupt initiator matches the safety level of the interrupt target device.

4004*b*. When both the interrupt initiator and the interrupt target device belong to the second subsystem, determine that the safety level of the interrupt initiator matches the safety level of the interrupt target device.

When the safety level of the interrupt initiator is higher than or equal to the safety level of the interrupt receiver, the interrupt receiver is allowed to receive the interrupt request initiated by the interrupt initiator, so as to prevent a device with a high safety level from receiving or processing an interrupt request initiated by a device with a low safety level. This prevents an exception of the device with a low safety level from affecting the device with a high safety level as far as possible.

Optionally, when the safety level of the memory access initiator is lower than the safety level of the memory to be accessed by the memory access initiator, it is determined that the safety level of the memory to be accessed by the memory access initiator does not match the safety level of the memory access initiator.

Optionally, the method shown in FIG. 9 further includes the following.

4005. Receive a memory access request from a memory access initiator, where the memory access request carries a memory address to be accessed by the memory access initiator and safety level information of the memory access initiator.

4006. When a safety level of a memory to be accessed by the memory access initiator matches a safety level of the memory access initiator, allow the memory access initiator to access the memory address to be accessed by the memory access initiator, where the memory safety level division information is used to indicate safety levels of memories in different segments.

Optionally, that the safety level of the memory to be accessed by the memory access initiator matches the safety level of the memory access initiator includes that the safety level of the memory access initiator is higher than or equal to the safety level of the memory to be accessed by the memory access initiator.

Because the memory access initiator can access only a memory with the same safety level or a lower safety level, it is possible to prevent a device in a low-safety system from accessing a memory with a higher safety level as far as possible, thereby achieving isolation of the memory to some extent.

Figure 10:
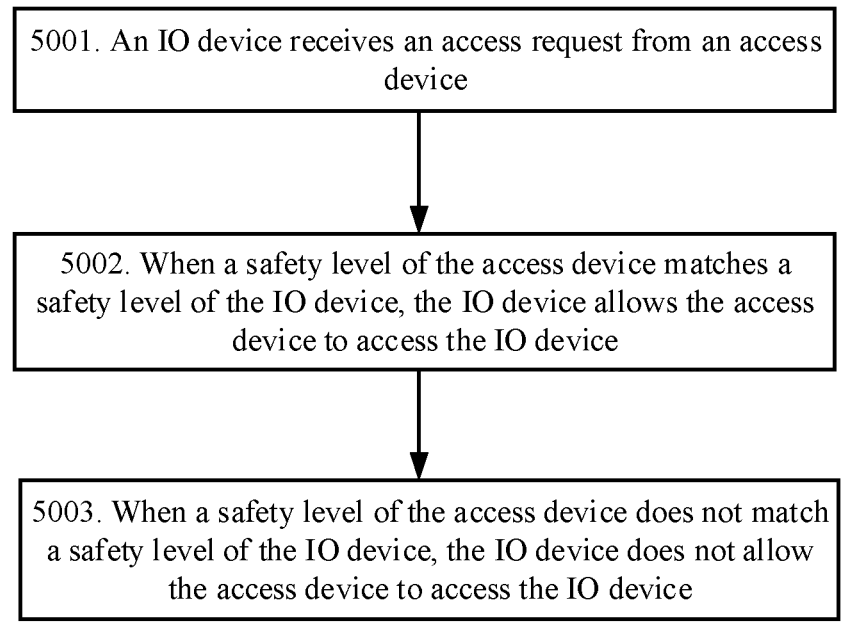
FIG. 10 is a schematic flowchart of a communication method according to an embodiment of this application.

The following describes in detail the communication method in the embodiments of this application with reference to FIG. 10.

FIG. 10 is a schematic flowchart of a communication method according to an embodiment of this application. The communication method shown in FIG. 10 is applied to a computer system, the computer system includes a first subsystem and a second subsystem, an operating system of the first subsystem is different from an operating system of the second subsystem, a CPU core of the first subsystem and a CPU core of the second subsystem are integrated on a same chip.

The method shown in FIG. 10 includes steps 5001 and 5002, and the two steps are described in detail below.

5001. An IO device receives an access request from an access device.

The access request carries safety level information of the access device, and the IO device is any IO device in the first subsystem or the second subsystem.

5002. When a safety level of the access device matches a safety level of the IO device, the IO device allows the access device to access the IO device.

Further, the method shown in FIG. 10 may further include step 5003.

5003. When a safety level of the access device does not match a safety level of the IO device, the IO device does not allow the access device to access the IO device.

Optionally, that the safety level of the access device matches the safety level of the IO device includes the safety level of the access device is higher than or equal to the safety level of the IO device.

The computer system to which the communication method in the embodiments of this application is applied may be an autonomous driving system (or it may also be considered that the computer system is located in an autonomous driving system). The following describes in detail a specific structure of the autonomous driving system with reference to FIG. 11.

Figure 11:
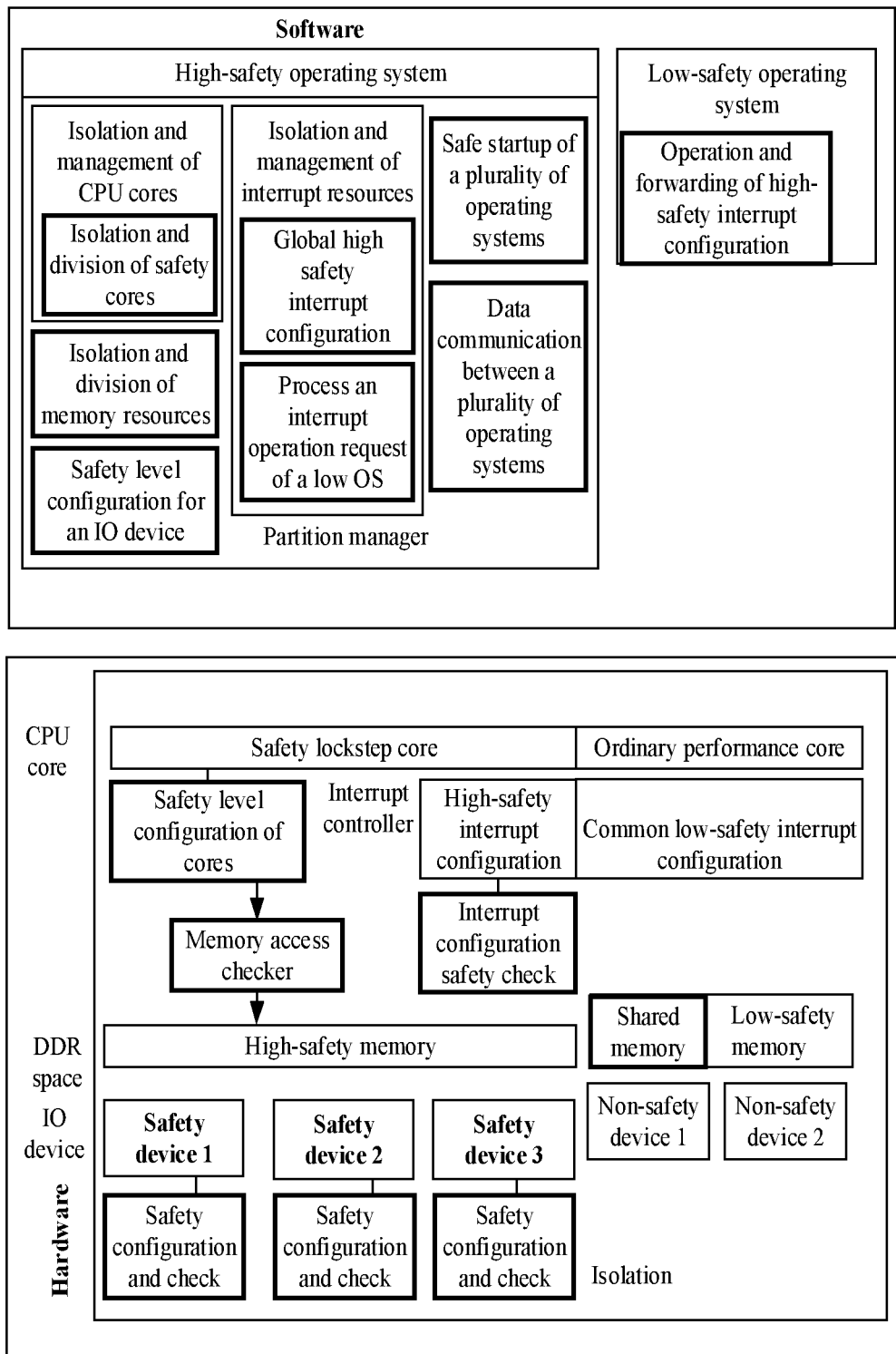
FIG. 11 is a schematic structural diagram of an autonomous driving system.

FIG. 11 is a schematic structural diagram of an autonomous driving system.

As shown in FIG. 11, the autonomous driving system may be divided into a high-safety operating subsystem and a low-safety operating subsystem in terms of software. An ASIL of the high-safety operating subsystem is higher than that of the low-safety subsystem. For example, the ASIL of the high-safety subsystem may be ASIL-D, and the ASIL of the low-safety subsystem may be any one of QM, ASIL-A, ASIL-B, and ASIL-C.

The first subsystem in the embodiment of this application may be equivalent to the high-safety operating system shown in FIG. 11, and the second subsystem may be equivalent to the low-safety operating system shown in FIG. 11.

The autonomous driving system shown in FIG. 11 may be divided into a hardware layer and a software layer. The hardware layer provides safety attribute configuration, safety detection, safety error reporting, and the like. The software layer provides a partition manager for resource isolation and division, and interrupt management based on this platform. The following separately describes the hardware layer and the software layer in detail.

Hardware Layer:

Logic for safety configuration and detection is added to the hardware layer to detect whether direct memory access (DMA) of the operating system software and device is valid. The logic for safety configuration and detection includes safety level configuration for a CPU core, memory access safety detection by a memory access checker, safety configuration and check for an IO device, and interrupt configuration safety check. The following separately describes the logic for safety configuration and detection in detail.

Safety level configuration for a CPU core used to configure a corresponding safety level for the CPU core (the CPU core in the high-safety subsystem is configured to be at a high safety level, and the CPU core in the low-safety subsystem is configured to be at a low safety level). After the corresponding safety level is configured for the CPU core, a signal sent by the CPU core may carry corresponding safety level information and be transmitted over a bus.

Further, configuring the safety level for the CPU core can be implemented by configuring safety level information for a safety level configuration module corresponding to the CPU core.

Memory access checker performs safety check on address access sent to a memory double data rate (DDR). Access is allowed only when safety levels match, otherwise, access is rejected.

Interrupt configuration safety check checks a safety level of an interrupt to ensure that only a CPU with a high safety level can perform an operation on a high-safety interrupt configuration, otherwise, access is rejected.

Safety configuration and check for an IO device used to configure the corresponding IO device as different safety levels. After the safety level configuration is completed, address access sent by the IO device carries a safety level signal. In addition, this module can further perform safety level check on an access request for a current device initiated by another device, to determine whether safety levels match.

Software Layer:

A partition manager is mainly added to the software layer for resource isolation and division, and shared memory communication between different functional safety partitions. The partition manager mainly includes the following modules: isolation and division of CPU cores, isolation and division of memory resources, safety level configuration for IO devices, isolation and configuration of interrupt resources, safe startup of a plurality of operating systems, and data communication based on a shared memory. The following describes in detail functions of each module.

Isolation and division of safety cores: This module is configured to divide a safety level of a CPU core used by each operating system. Further, CPUs used by the high-safety operating system and the low-safety operating system may be written in a configuration file without sharing with each other (a CPU core does not belong to both a high-safety system and a low-safety system). For example, during system startup, the CPU used by the high-safety operating system may be configured to be in lockstep mode and to have a functional safety level of ASIL-D, and the CPU used by the low-safety operating system may be configured to be in common mode and to have a functional safety level of ASIL-B or QM level.

Isolation and division of memory resources: This module is configured to divide memories used by different operating systems, and the memories are not shared with each other. The high-safety operating system uses a memory of the ASIL-D level, and the low-safety operating system uses a memory of the ASIL-B or QM level. In addition, this module can further write memory layout information (memory allocation information) into the memory access checker through the register.

Safety level configuration for an IO device used to configure a functional safety level of each IO device, such as an ASIL-D, ASIL-B, or QM level.

Isolation and configuration of interrupt resources used to manage globally shared key high-safety interrupt configuration, and can further process an operation request for high interrupt configuration sent by the low-safety operating system. If the request is valid, this module performs the operation on behalf, otherwise, the operation request is rejected.

Safe startup of a plurality of operating systems: This module is configured to start up operating systems of corresponding functional safety levels on the high-safety CPU and the low-safety CPU, respectively.

Data communication between a plurality of operating systems: A shared memory segment is allocated in a memory with low functional safety for data transmission between operating systems with different functional safety levels. When data is placed in the shared memory, an interrupt is used to notify the other party to fetch the data, and the system with high functional safety checks validity of data in the shared memory sent by the system with low functional safety.

It should be understood that the safety configuration and check for the safety device in FIG. 11 may be further performed by a safety configuration and detection module, and the safety level configuration for the CPU core may be performed by a safety level configuration module of the CPU core. The safety configuration and detection module, the safety level configuration module, the interrupt controller, and the memory access checker may be integrated on the same chip (the chip is not shown in the figure).

Figure 12:
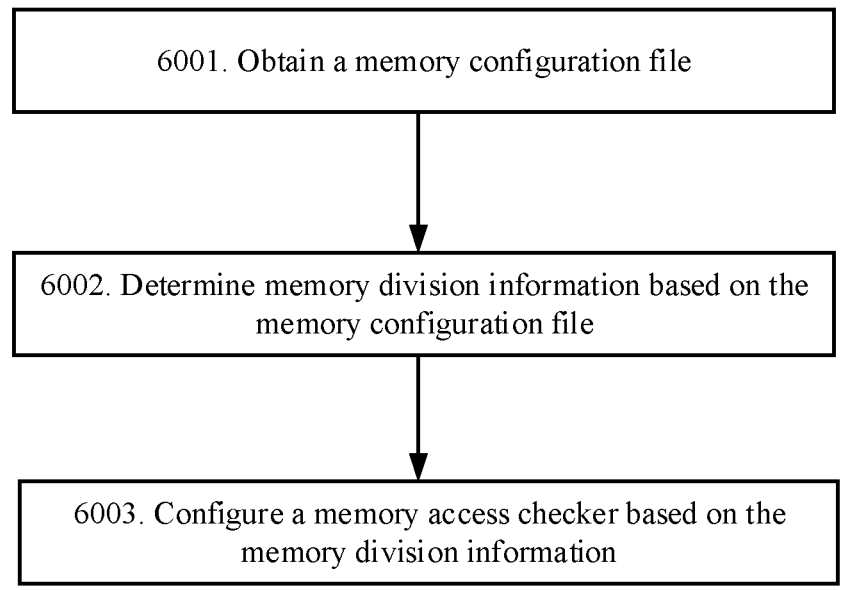
FIG. 12 is a schematic diagram of a process of configuring a memory access checker by a partition manager.

The following further describes a process of configuring a memory access checker by a partition manager with reference to FIG. 12.

FIG. 12 is a schematic diagram of configuring a memory access checker by a partition manager. The process shown in FIG. 12 includes step 6001 to step 6003, and these steps are described in detail below.

6001. Obtain a memory configuration file.

The ARM64 platform is used as an example. The foregoing memory configuration file may be carried in a device tree source (device tree source, DTS) file. The foregoing memory configuration file may be divided into memory address ranges to be used by subsystems of different safety levels. For example, the foregoing memory configuration file may include the following configuration information:

```
memory_ASIL_D@0
{
    device_type = "memory";
    reg = <0x0 0x00000000 0x0 0x40000000>;
};
memory_ASIL_B@0x40000000
{
    device_type = "memory";
    reg = <0x0 0x40000000 0x0 0x40000000>;
};
```

The foregoing configuration information indicates that the memories in the range of 0-0x40000000 are allocated to subsystems of the ASIL-D safety level, and the memories in the range of 0x40000000-0x80000000 are allocated to subsystems of the ASIL-B safety level.

6002. Determine memory division information based on the memory configuration file.

After obtaining the memory configuration file, the partition manager determines the memory division information by parsing the memory configuration file.

6003. Configure the memory access checker based on the memory division information.

For example, by parsing configuration information, the partition manager determines that the memories in the range of 0-0x40000000 are allocated to subsystems of the ASIL-D safety level, and the memories in the range of 0x40000000-0x80000000 are allocated to subsystems of the ASIL-B safety level. Next, the partition manager may configure a memory division result to the memory access checker, so that the memory access checker can perform safety check on memory address access initiated by each operating system or another IO device.

Further, when a low-safety operating system needs to access an ASIL-D memory of a high-safety operating system, the memory access checker detects that safety levels do not match, intercepts memory address access, and reports a safety interrupt to notify application software that an out-of-bounds access safety error has occurred.

The communication method in the embodiments of this application is described in detail above with reference to the accompanying drawings. The following describes a computer system and a processing apparatus in the embodiments of this application with reference to the accompanying drawings. It should be understood that the computer system and the processing apparatus described below can perform corresponding steps of the communication method in the embodiments of this application. Repeated descriptions are appropriately omitted when the computer system and the processing apparatus in the embodiments of this application are described below.

Figure 13:
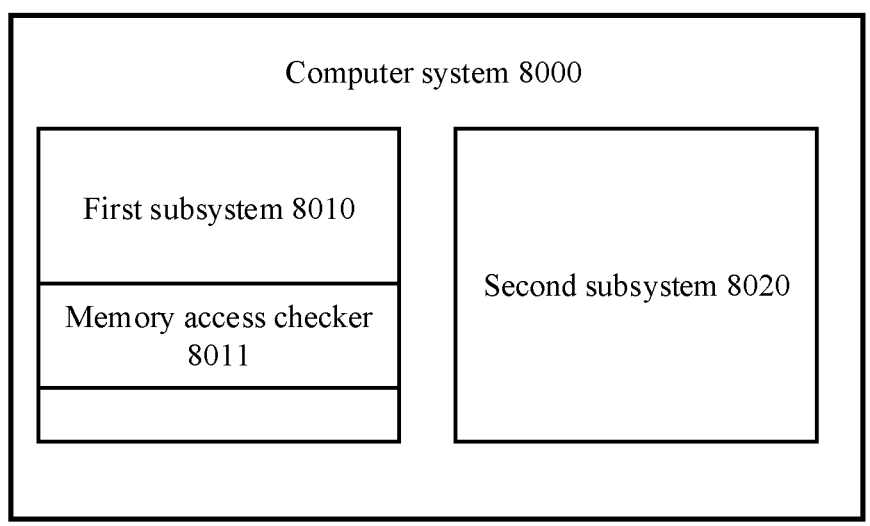
FIG. 13 is a schematic block diagram of a computer system according to an embodiment of this application.

FIG. 13 is a schematic block diagram of a computer system according to an embodiment of this application. A computer system 8000 shown in FIG. 13 includes a first subsystem 8010 and a second subsystem 8020, and the first subsystem 8010 includes a memory access checker 8011.

A safety level of the first subsystem 8010 is higher than a safety level of the second subsystem 8020, and a CPU core of the first subsystem 8010, a CPU core of the second subsystem 8020, and the memory access checker 8011 are integrated on the same chip.

The memory access checker 8011 is configured to receive a memory access request from a memory access initiator, where the memory access request carries a memory address to be accessed by the memory access initiator and safety level information of the memory access initiator.

The memory access checker 8011 is further configured to determine, based on preconfigured memory safety level division information, whether a safety level of a memory to be accessed by the memory access initiator matches a safety level of the memory access initiator, and allow the memory access initiator to access the memory address when a safety level of the memory address matches the safety level of the memory access initiator, where the memory safety level division information is used to indicate safety levels of memories in different address segments of the computer system.

Optionally, the computer system 8000 further includes an IO device configured to receive an access request from an access device, where the access request carries safety level information of the access device, and the IO device is any IO device in the first subsystem or the second subsystem, and the IO device is further configured to when a safety level of the access device matches a safety level of the IO device, allow the access device to access the IO device.

Optionally, that the safety level of the access device matches the safety level of the IO device includes the safety level of the access device is higher than or equal to the safety level of the IO device.

Optionally, the computer system 8000 further includes an interrupt controller, where the first subsystem and the second subsystem share the interrupt controller, interrupt routing configuration information stored in the interrupt controller is configured by the CPU core of the first subsystem, and the interrupt routing configuration information is used to indicate a CPU core that responds to each interrupt, the interrupt controller is configured to receive an interrupt request from an interrupt initiator, where the interrupt request carries safety level information of the interrupt initiator, and determine whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allow the interrupt receiver to accept the interrupt request.

Optionally, that the safety level of the interrupt initiator matches the safety level of the interrupt receiver includes both the interrupt initiator and the interrupt receiver belong to the first subsystem, both the interrupt initiator and the interrupt receiver belong to the second subsystem, or the interrupt initiator belongs to the first subsystem, and the interrupt receiver belongs to the second subsystem.

Optionally, that the safety level of the memory to be accessed by the memory access initiator matches the safety level of the memory access initiator includes the safety level of the memory access initiator is higher than or equal to the safety level of the memory to be accessed by the memory access initiator.

Optionally, the first subsystem further includes a partition manager, and the partition manager is configured to configure safety levels for devices in the first subsystem and the second subsystem based on a safety level configuration file of the computer system, where the safety level configuration file of the computer system is used to indicate the safety levels of the devices in the first subsystem and the second subsystem, and safety levels of memories used by the first subsystem and the second subsystem.

Optionally, the partition manager is configured to write safety level information of a CPU core of the computer system into a safety level configuration module corresponding to the CPU core of the computer system, where the safety level information of the CPU core of the computer system is used to indicate a safety level of the CPU core of the computer system.

Optionally, the partition manager is configured to write the memory safety level division information into the memory access checker.

Optionally, the partition manager is configured to write safety level information of the IO device into a safety level configuration and detection module corresponding to the IO device, the safety level configuration and detection module corresponding to the IO device is configured to detect an access request received by the IO device, to determine whether a safety level of a device that initiates the access request matches the safety level of the IO device, and the IO device is any IO device in the first subsystem or the second subsystem.

Optionally, the computer system further includes an initial startup module configured to start a first CPU core of the first subsystem, so that the partition manager runs on the first CPU core of the first subsystem, where the partition manager is configured to start another CPU core of the first subsystem, and after starting of the CPU core of the first subsystem is completed, the partition manager is further configured to start a CPU core of the second subsystem.

Optionally, a memory of the second subsystem includes a shared memory, the shared memory is used to transmit data between the first subsystem and the second subsystem, the CPU core of the first subsystem is configured to store first communication data generated by the first subsystem in the shared memory, and initiate a first interrupt, so that after receiving the first interrupt, the CPU core of the second subsystem reads the first communication data from the shared memory, or the CPU core of the second subsystem is configured to store second communication data generated by the second subsystem in the shared memory, and initiate a second interrupt, so that after receiving the second interrupt, the CPU core of the first subsystem reads the second communication data from the shared memory.

Figure 14:
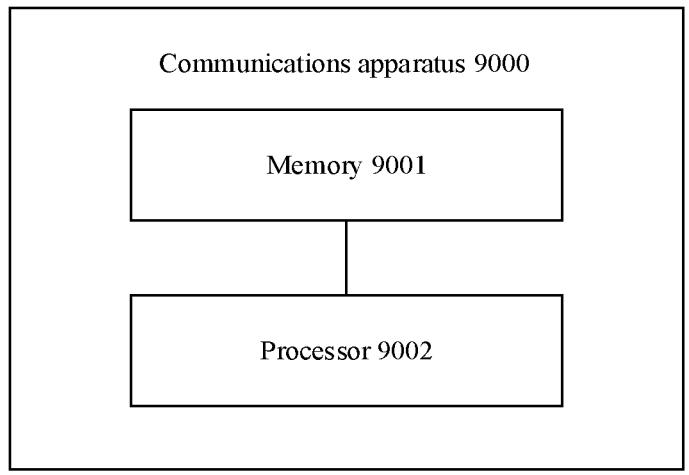
FIG. 14 is a schematic block diagram of a processing apparatus according to an embodiment of this application.

FIG. 14 is a schematic block diagram of a processing apparatus according to an embodiment of this application. A processing apparatus 9000 shown in FIG. 14 includes a memory 9001 and a processor 9002.

The processing apparatus 9000 shown in FIG. 14 may be applied to a computer system, the computer system includes a first subsystem and a second subsystem, an operating system of the first subsystem is different from an operating system of the second subsystem, a CPU core of the first subsystem and a CPU core of the second subsystem are integrated on a same chip, and the processing apparatus is located in the first subsystem.

The foregoing memory 9001 is configured to store a program. When the program stored in the memory 9001 is executed by the processor 9002, the processor 9002 is configured to perform each step in the method shown in FIG. 8.

Figure 15:
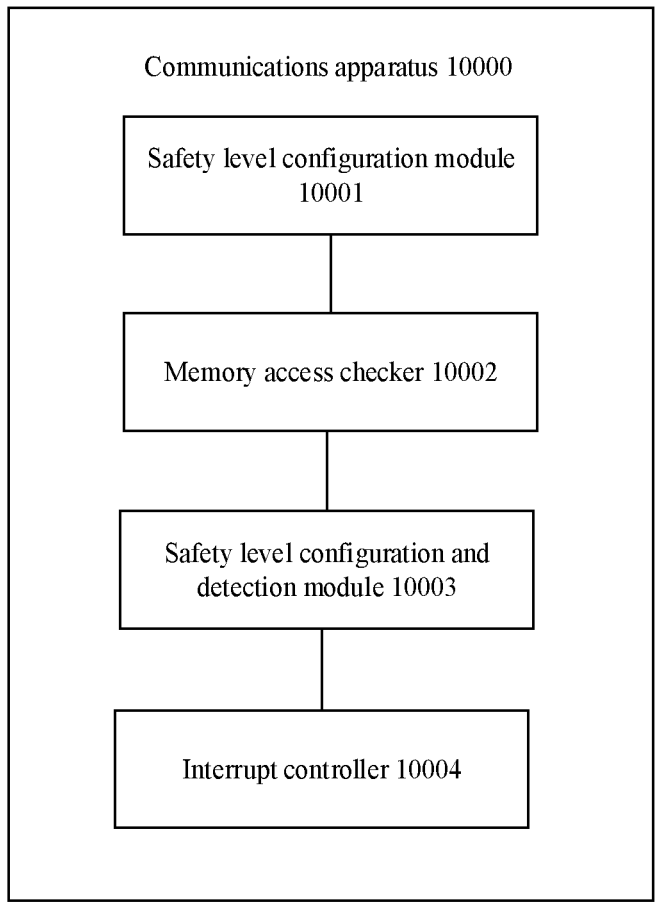
FIG. 15 is a schematic block diagram of a processing apparatus according to an embodiment of this application.

FIG. 15 is a schematic block diagram of a processing apparatus according to an embodiment of this application. A processing apparatus 10000 shown in FIG. 15 includes a memory 10001 and a processor 10002.

The processing apparatus 10000 shown in FIG. 15 may be applied to a computer system, the processing apparatus 10000 is applied to the computer system, the computer system includes a first subsystem and a second subsystem, an operating system of the first subsystem is different from an operating system of the second subsystem, a CPU core of the first subsystem and a CPU core of the second subsystem are integrated on the processing apparatus 10000, the processing apparatus 10000 is located in the first subsystem, and the processing apparatus 10000 includes a safety level configuration module 10001 configured to receive safety level configuration information of the first subsystem and the second subsystem, where the safety level configuration module 10001 is further configured to configure safety levels of the first subsystem and the second subsystem based on a received safety level configuration file, where a safety level of a memory used by the first subsystem is higher than a safety level of a memory of the second subsystem.

The processing apparatus 10000 may be a chip in the computer system.

Optionally, the safety level configuration module 10001 is configured to receive safety level information of each CPU core in the computer system, to configure a safety level of each CPU core in the computer system.

Optionally, the processing apparatus further includes a memory access checker 10002 configured to receive memory safety level division information, where the memory safety level division information is used to indicate safety levels of memories in different address segments of the computer system.

Optionally, the processing apparatus further includes a safety level configuration and detection module 10003 configured to receive safety level information of an IO device in the computer system, where the safety level configuration and detection module 10003 is further configured to detect an access request received by the IO device in the computer system, to determine whether a safety level of an access device that initiates the access request matches a safety level of the IO device in the computer system.

Optionally, the processing apparatus further includes an interrupt controller 10004 configured to determine whether a safety level of the interrupt initiator matches a safety level of an interrupt receiver corresponding to the interrupt initiator based on configured safety level information and the interrupt request, and when the safety level of the interrupt initiator matches the safety level of the interrupt receiver, allow the interrupt receiver to accept the interrupt request.

Optionally, that the safety level of the interrupt initiator matches the safety level of the interrupt receiver includes both the interrupt initiator and the interrupt receiver belong to the first subsystem, both the interrupt initiator and the interrupt receiver belong to the second subsystem, or the interrupt initiator belongs to the first subsystem, and the interrupt receiver belongs to the second subsystem.

Optionally, the safety level configuration module 10001 is configured to receive a memory access request from a memory access initiator, where the memory access request carries a memory address to be accessed by the memory access initiator and safety level information of the memory access initiator, and when a safety level of a memory to be accessed by the memory access initiator matches a safety level of the memory access initiator, allow the memory access initiator to access the memory address to be accessed by the memory access initiator, where the memory safety level division information is used to indicate safety levels of memories in different segments.

Optionally, that the safety level of the memory to be accessed by the memory access initiator matches the safety level of the memory access initiator includes the safety level of the memory access initiator is higher than or equal to the safety level of the memory to be accessed by the memory access initiator.

Figure 16:
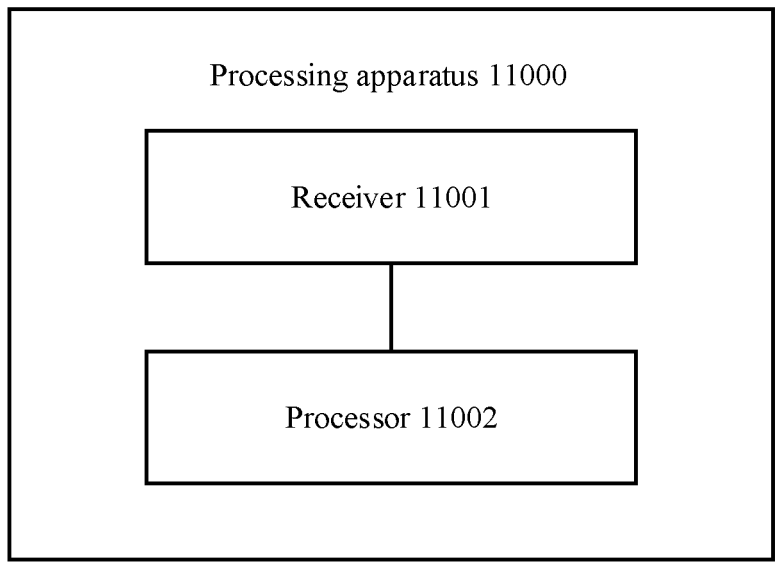
FIG. 16 is a schematic block diagram of a processing apparatus according to an embodiment of this application.

FIG. 16 is a schematic block diagram of a processing apparatus according to an embodiment of this application. A processing apparatus 11000 shown in FIG. 16 includes a receiver 11001 and a processor 11002.

The processing apparatus 11000 shown in FIG. 16 may be applied to a computer system, the computer system includes a first subsystem and a second subsystem, an operating system of the first subsystem is different from an operating system of the second subsystem, a CPU core of the first subsystem and a CPU core of the second subsystem are integrated on a same chip, and the processing apparatus 11000 is located in the first subsystem.

The receiver 11001 and the processor 11002 in the foregoing processing apparatus 11000 can be configured to perform the steps in the method shown in FIG. 10.

The foregoing apparatus 11000 may be a device in the computer system, for example, an IO device.

To provide a further understanding of the communication method and the related apparatus in the embodiments of this application, the following describes the related communication process in detail by using the autonomous driving system as an example.

Figure 17:
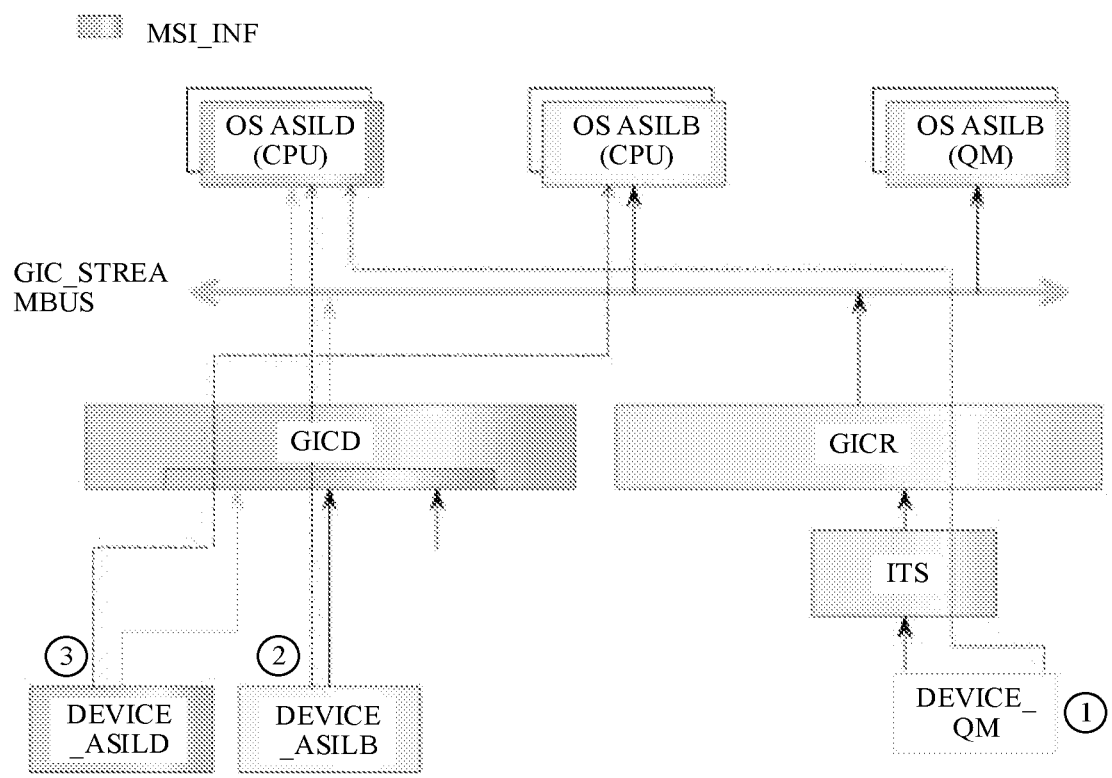
FIG. 17 is a schematic diagram of interrupt configuration in an autonomous driving system.

As shown in FIG. 17, during hardware design of the autonomous driving system, the configuration of the interrupt controller can be divided into two parts. The core and shared interrupt configuration is designed as the ASIL-D level, and can be operated only by a safety lockstep core. This prevents a low-safety operating system on a non-lockstep core from maliciously changing an interrupt when the low-safety operating system fails, thereby avoiding impact on a high-safety operating system. The interrupt configuration includes interrupt enabling, interrupt disabling, interrupt routing, and the like. If an ordinary CPU core (non-lockstep core) wants to perform an operation on this configuration, the ordinary CPU core needs to send a request to the lockstep core, and the lockstep core performs the operation on behalf. Per-core configuration and some low-safety configurations are not distinguished by safety level, and can be operated by each CPU, including the ordinary CPU in which the low-safety operating system is located. Because the high-safety operating system does not use these configurations, even if the low-safety operating system is faulty, operation of the high-safety operating system is not affected.

In FIG. 17, GIC_STREAMBUS represents a bus, GICD represents an interrupt distributor, GICR represents an interrupt redistributor, and ITS represents an interrupt translation service (ITS) component. DEVICE_ASILD represents a device whose safety level is ASIL D, DEVICE_ASILB represents a device whose safety level is ASIL B, DEVICE_QM represents a device whose safety level is QM, OS ASILD represents an operating system whose safety level is ASIL D, and OS ASILB represents an operating system whose safety level is ASIL B.

The interrupt configuration is described above with reference to FIG. 17. The following describes the partition manager and the interrupt processing procedure with reference to FIG. 18.

The partition manager is located in the high-safety operating system. During the system startup, the partition manager invokes an interrupt controller driver based on a configuration status of the configuration file of the high-safety operating system to configure globally shared ASIL-D resources, including non-ASIL-D resources (configurations) used by the high-safety operating system.

Figure 18:
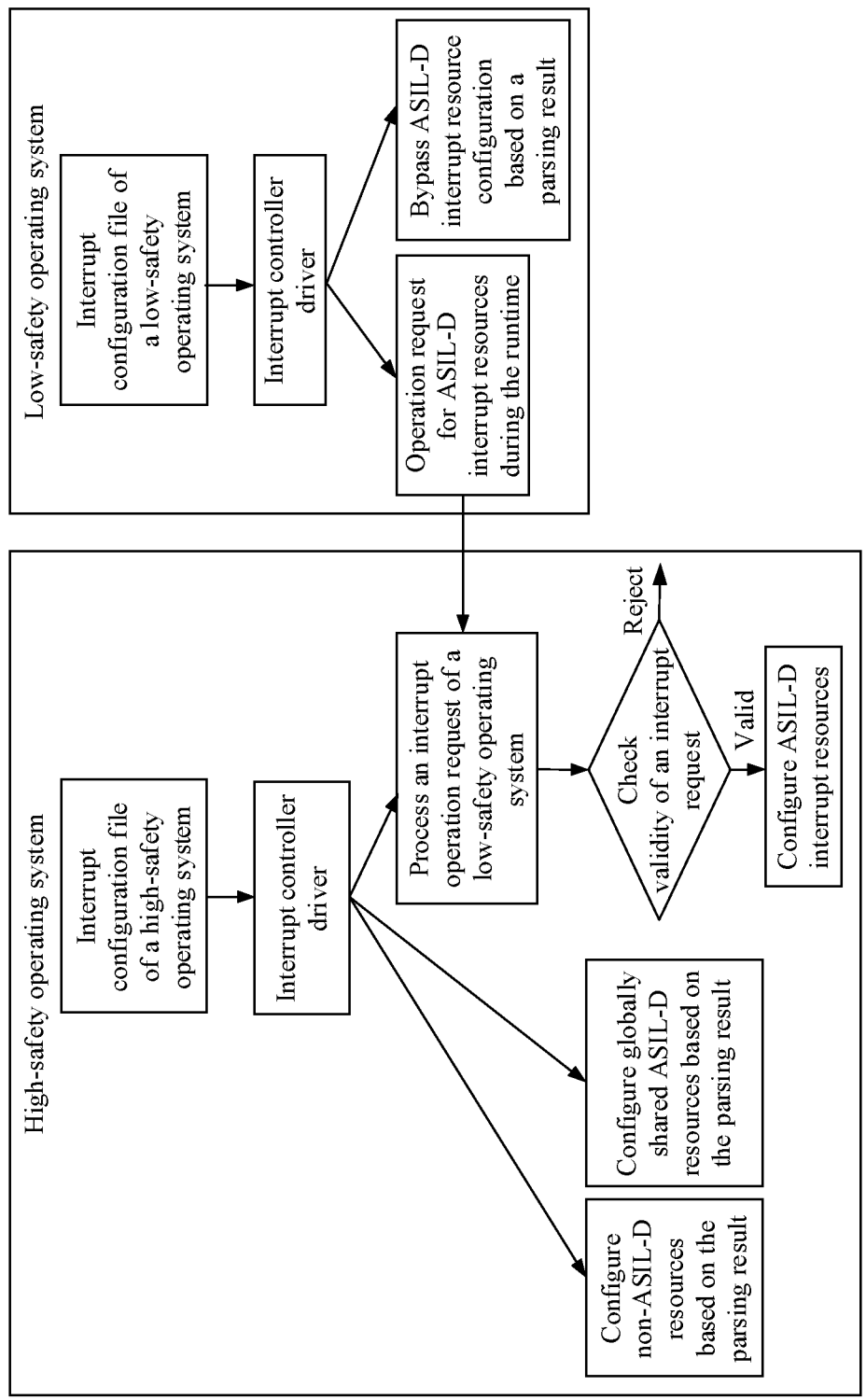
FIG. 18 is a schematic diagram of an interrupt processing procedure.

During the startup of the low-safety operating system, the partition manager parses the interrupt configuration file, bypasses an operation on the ASIL-D interrupt configuration, and converts the operation on the ASIL-D interrupt into an interrupt operation request for the high-safety operating system, so that the high-safety operating system performs the operation on behalf. After receiving the request, the high-safety operating system checks whether the operation is valid. For example, a to-be-operated interrupt number belongs to a device managed by the high-safety operating system, and the high-safety operating system rejects the operation, because devices managed by the two operating systems are independent and not shared. Similarly, for the globally shared ASIL-D interrupt configuration that has been initialized, the high-safety operating system also rejects the operation, because the high-safety operating system has been initialized by the partition manager during the startup, and does not need to be reinitialized. The foregoing process is shown in FIG. 18. In consideration of performance, the low-safety operating system reduces operations on the ASIL-D interrupt configuration during the runtime.

Figure 19:
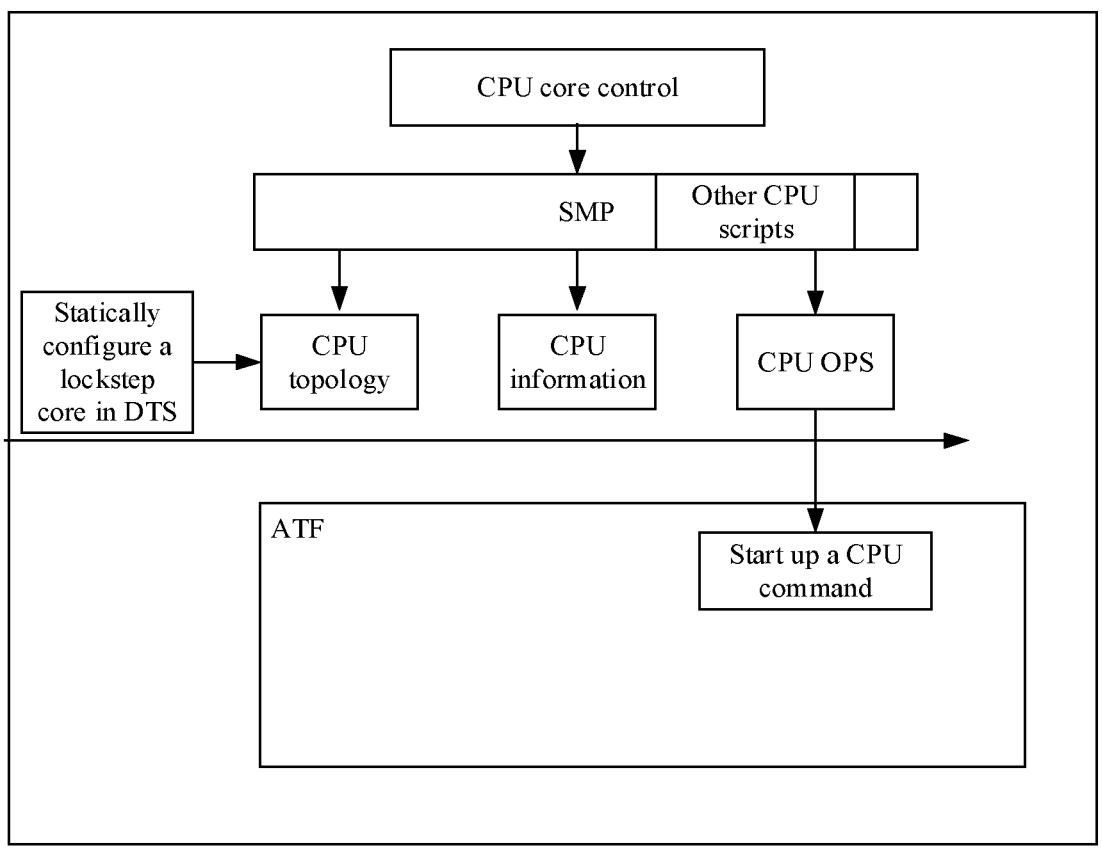
FIG. 19 is a schematic diagram of starting a computer system.

The operating system with high functional safety isolates the used CPU and performs configuration in the configuration file in advance. For example, for the Advanced Reduced Instruction Set Architecture (RISC) Machines 64 (ARM64) platform, the configuration file is Device Tree Source (DTS), and the OS kernel can know which CPUs are to be used by parsing the DTS configuration file, and establish a CPU topology. During symmetric multiprocessing (SMP) boot, the partition manager notifies the Basic Input/Output System (BIOS) or ARM trusted firmware (ATF) (ARM64 platform) in turn based on the configuration file, to configure a to-be-started CPU to be in a lockstep or common state, and start up the corresponding CPU to run. The process is shown in FIG. 19.

After starting of the local SMP of the high-safety operating system is completed, the partition manager starts up a first core of the low-safety operating system. After the first core of the low-safety operating system is started up, the first core jumps to an internal kernel portal address of the low-safety operating system, and then is initialized. CPUs to be used by the low-safety operating system are allocated in advance in the configuration file. The low-safety operating system starts up the CPUs allocated to it in turn based on CPU allocation in the configuration file of the low-safety operating system. The CPU belonging to the low-safety operating system does not need to be configured to be in a lockstep state.

Figure 20:
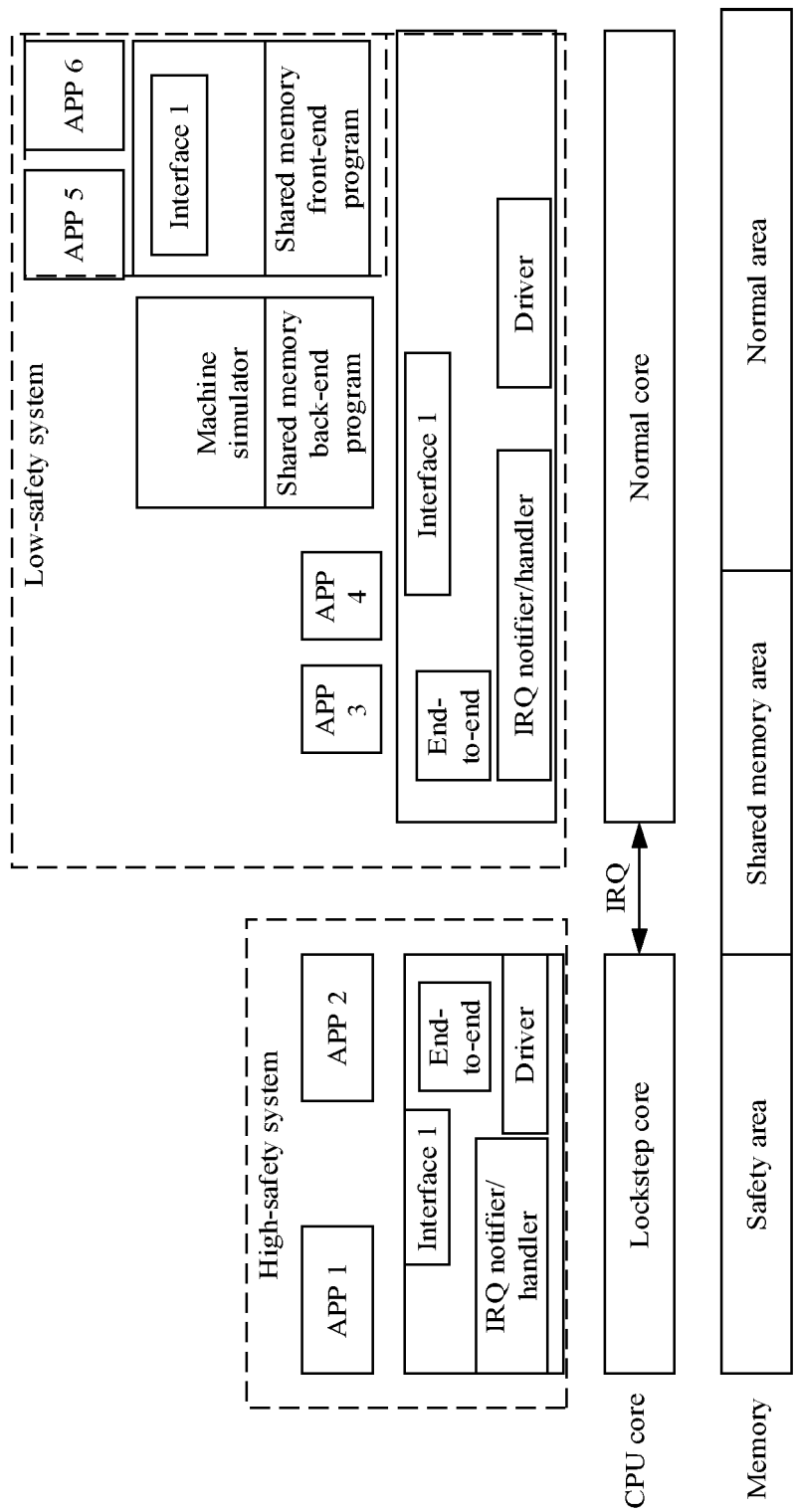
FIG. 20 is a schematic diagram of shared communication between different subsystems.

The following describes in detail the process of shared communication between different subsystems with reference to FIG. 20.

As shown in FIG. 20, a memory may be divided into different functional safety areas, such as ASIL-D and ASIL-B. OSs with different functional safety use different levels of memory areas. For example, a high-safety OS uses an ASIL-D memory, and an OS with low functional safety uses an ASIL-B memory. When shared memory communication is performed between the two OSs, a memory segment is allocated in a memory area with low functional safety, so that both OSs can access this area through reading and writing. The following separately describes functions of each module shown in FIG. 20.

Interrupt request (IRQ) notifier/handler: When one OS places data in the shared memory, the OS invokes an IRQ notifier to notify the other OS to fetch the data in the shared memory. After receiving an interrupt, the other OS accesses an IRQ handler, checks a shared memory from which data needs to be fetched in the handler, and notifies a target app to fetch the data.

Driving hmem driver: The driver provides a function of allocating a shared memory area, and provides a mapped memory to a user mode for use.

Interface 1 is Libshmem, which is an encapsulation interface provided to an upper-layer user mode, and performs an operation on the shared memory through interfaces such as open and mmap.

When a guest OS is run on the low-safety OS through a hypervisor, the guest OS provides the shmem FE driver that communicates with the low-safety host OS. The driver communicates with the shmem BE driver to complete reading and writing of the guest OS on the shared memory.

Shmem FE driver: The shared memory front-end program provides an address mapping function of the Stage1 of the guest OS, and is connected to the shmem BE driver of the host OS.

Shmem BE driver: The shared memory back-end program handles the exit of the shared memory front-end program, invokes libshmem to complete mapping of the Stage2, and invokes an IRQ notifier to notify the peer OS to receive data. When receiving the data sent by the peer OS, the shared memory back-end program injects an interrupt to the guest OS. After receiving the injected interrupt, the shared memory front-end program notifies the corresponding app in the guest to read the data.

End-to-end (E2E): E2E protection, when data is transmitted from a high-safety operating system to a low-safety operating system, integrity and correctness of the data are checked through CRC.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for a computer system, the computer system comprising a first subsystem and a second subsystem, a first subsystem safety level of the first subsystem being higher than a second subsystem safety level of the second subsystem, the method comprising:
   configuring, by a partition manager of the first subsystem, a first memory safety level of a first memory based on a safety level configuration file of the computer system, the safety level configuration file indicating the first memory safety level of the first memory;
   configuring, by the partition manager, a memory access initiator safety level of a memory access initiator of the computer system;
   writing, by the partition manager, a preconfigured memory safety level division information into a memory access checker of the computer system;
   receiving, by the memory access checker, a memory access request from the memory access initiator, the memory access request comprising a first memory address of the first memory to be accessed by the memory access initiator and a memory access initiator safety level of the memory access initiator;
   determining, by the memory access checker and based on the preconfigured memory safety level division information, whether the first memory safety level matches the memory access initiator safety level, the preconfigured memory safety level division information indicating safety levels of memories in different address segments of the computer system; and
   allowing, by the memory access checker, the memory access initiator to access the first memory when the first memory safety level matches the memory access initiator safety level.

2. The method of claim 1, further comprising:
   storing, by an interrupt controller of the computer system, interrupt routing configuration information configured by the first CPU core, wherein the interrupt routing configuration information indicates a third CPU core of the computer system configured to respond to an interrupt, and wherein the first subsystem and the second subsystem share the interrupt controller;
   receiving, by the interrupt controller, an interrupt request from an interrupt initiator, wherein the interrupt request comprises an interrupt initiator safety level of the interrupt initiator;
   determining, by the interrupt controller, whether the interrupt initiator safety level matches a interrupt receiver safety level of an interrupt receiver corresponding to the interrupt initiator and based on the interrupt request; and
   allowing, by the interrupt controller, the interrupt receiver to accept the interrupt request when the interrupt initiator safety level matches the interrupt receiver safety level.

3. The method of claim 1, further comprising writing, by the partition manager, a fourth CPU core safety level information of a fourth CPU core of the computer system into a safety level configuration component corresponding to the fourth CPU core.

4. The method of claim 1, further comprising:
   starting a fifth CPU core of the first subsystem to run the partition manager on the fifth CPU core;
   starting, by the partition manager, a sixth CPU core of the first subsystem;
   starting, by the partition manager, a seventh CPU core of the second subsystem after starting the sixth CPU core; and
   starting, by the second subsystem, an eighth CPU core of the second subsystem after starting the seventh CPU core.

5. The method of claim 1, wherein a third memory of the second subsystem comprises a shared memory, wherein the shared memory transmits data between the first subsystem and the second subsystem, and wherein the method further comprises:
   storing, by the first CPU core, first communication data of the first subsystem in the shared memory; and
   initiating, by the first CPU core, a first interrupt to enable the second CPU core to read the first communication data from the shared memory after receiving the first interrupt.

6. The method of claim 1, wherein a third memory of the second subsystem comprises a shared memory, wherein the shared memory transmits data between the first subsystem and the second subsystem, and wherein the method further comprises:
   storing, by the second CPU core, second communication data of the second subsystem in the shared memory; and initiating, by the second CPU core, a second interrupt to enable the first CPU core to read the second communication data from the shared memory after receiving the second interrupt.

7. The method of claim 1, wherein a memory access checker safety level of the memory access checker is the same or different from the first subsystem safety level.

8. A computer system comprising:
a chip;
a first memory coupled to the chip and comprising a first safety level;
a first subsystem coupled to the first memory, the first subsystem having a first subsystem safety level, the first subsystem comprising:
  a memory access checker integrated on the chip and comprising:
    a transceiver configured to receive a memory access request from a memory access initiator, the memory access request comprising a first memory address of the first memory to be accessed by the memory access initiator and a memory access initiator safety level of the memory access initiator; and
    a processor coupled to the transceiver and configured to:
      determine, based on the preconfigured memory safety level division information, whether the first memory safety level matches the memory access initiator safety level, the preconfigured memory safety level division information indicating safety levels of memories in different address segments of the computer system; and
      allow the memory access initiator to access the first memory when the first memory safety level matches the memory access initiator safety level; and
  a first central processing unit (CPU) core integrated on the chip and coupled to the memory access checker;
a partition manager configured to:
  configure a first memory safety level of a first memory based on a safety level configuration file of the computer system, the safety level configuration file indicating the first memory safety level of the first memory;
  configure a memory access initiator safety level of a memory access initiator of the computer system; and
  write a preconfigured memory safety level division information into a memory access checker of the computer system; and
a second subsystem comprising a second CPU core integrated on the chip,
wherein the first subsystem safety level of the first subsystem is higher than a second subsystem safety level of the second subsystem.

9. The computer system of claim 8, further comprising an input/output (TO) device located in the first subsystem or the second subsystem and configured to:
  receive an access request from an access device, wherein the access request comprises an access device safety level of the access device; and
  allow the access device to access the IO device when the access device safety level matches an IO device safety level of the IO device.

10. The computer system of claim 9, wherein the access device safety level is higher than or equal to the IO device safety level.

11. The computer system of claim 8, further comprising an interrupt controller coupled to the first subsystem and the second subsystem, wherein the interrupt controller is shared by the first subsystem and the second subsystem, and wherein the interrupt controller is configured to:
  store interrupt routing configuration information configured by the first CPU core, wherein the interrupt routing configuration information indicates a third CPU core of the computer system configured to respond to an interrupt;
  receive an interrupt request from an interrupt initiator, wherein the interrupt request comprises an interrupt initiator safety level of the interrupt initiator;
  determine whether the interrupt initiator safety level matches an interrupt receiver safety level of an interrupt receiver corresponding to the interrupt initiator and based on the interrupt request; and
  allow the interrupt receiver to accept the interrupt request when the interrupt initiator safety level matches the interrupt receiver safety level.

12. The computer system of claim 11, further comprising:
the first subsystem comprises both the interrupt initiator and the interrupt receiver;
the second subsystem comprises both the interrupt initiator and the interrupt receiver; or
the first subsystem comprises the interrupt initiator and the second subsystem comprises the interrupt receiver.

13. The computer system of claim 8, wherein the second subsystem safety level is higher than or equal to the first subsystem safety level.

14. The computer system of claim 8, further comprising a fourth CPU core comprising a fourth CPU core safety level, wherein the partition manager is further configured to write the fourth CPU core safety level into a safety level configuration component corresponding to the fourth CPU core.

15. The computer system of claim 8, further comprising an input/output (TO) device located in the first subsystem or the second subsystem and comprising IO device safety level, the IO device is configured to receive an access request, the partition manager is further configured to write the IO device safety level into a safety level configuration and detection component corresponding to the IO device, and the safety level configuration and detection component is configured to:
  configure a sixth safety level for the IO device; and
  detect the access request received by the IO device to determine whether a twelfth safety level of a device that initiates the access request matches the sixth safety level.

16. The computer system of claim 8, further comprising an initial startup component configured to start a fifth CPU core of the first subsystem to run the partition manager on the fifth CPU core, wherein the partition manager is further configured to:
  start a sixth CPU core of the first subsystem; and
  start a seventh CPU core of the second subsystem after starting the sixth CPU core;
  wherein the second subsystem is configured to start an eighth CPU core of the second subsystem after starting the seventh CPU core.

17. The computer system of claim 8, wherein the second subsystem further comprises a third memory, wherein the third memory comprises a shared memory that transmits data between the first subsystem and the second subsystem, wherein the first CPU core is configured to store first communication data of the first subsystem in the shared memory and initiate a first interrupt to enable the second CPU core to read the first communication data from the shared memory after receiving the first interrupt, or wherein the second CPU core is configured to store second communication data of the second subsystem in the shared memory and initiate a second interrupt to enable the first CPU core to read the second communication data from the shared memory after receiving the second interrupt.

18. The computer system of claim 8, wherein a memory access checker safety level of the memory access checker is the same or different from the first subsystem safety level.

\* \* \* \* \*